US007477412B2

(12) United States Patent
Miwa et al.

(10) Patent No.: US 7,477,412 B2
(45) Date of Patent: Jan. 13, 2009

(54) NETWORK DATA PROCESSING SYSTEM, NETWORK PRINTING SYSTEM, DATA PROCESSOR, PRINTER, DATA PROCESSING PROGRAM, PRINT PROCESSING PROGRAM, NETWORK DATA PROCESSING METHOD, AND NETWORK PRINTING METHOD

(75) Inventors: Shinji Miwa, Suwa (JP); Atsushi Nagahara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 928 days.

(21) Appl. No.: 10/954,470

(22) Filed: Oct. 1, 2004

(65) Prior Publication Data

US 2005/0105127 A1    May 19, 2005

(30) Foreign Application Priority Data

| Oct. 6, 2003 | (JP) | ............................. 2003-346843 |
| Jul. 2, 2004 | (JP) | ............................. 2004-196848 |

(51) Int. Cl.
*G06K 1/00* (2006.01)
*G06K 15/00* (2006.01)
*G06F 15/00* (2006.01)

(52) U.S. Cl. .................... 358/1.15; 358/1.16; 358/1.17; 358/1.18

(58) Field of Classification Search ................ 358/1.15, 358/1.16, 1.17, 1.18
See application file for complete search history.

(56) References Cited

U.S. PATENT DOCUMENTS

| 5,987,226 A * | 11/1999 | Ishikawa et al. ........... 358/1.13 |
| 6,331,896 B1 | 12/2001 | Morita |
| 6,945,717 B2 | 9/2005 | Hata et al. |
| 7,102,779 B2 * | 9/2006 | Lester et al. ................ 358/1.15 |
| 7,382,486 B2 * | 6/2008 | Yamaguchi ................ 358/1.18 |
| 2005/0066051 A1 * | 3/2005 | Miwa et al. .................. 709/233 |
| 2005/0219607 A1 * | 10/2005 | Yamaguchi et al. ........ 358/1.15 |
| 2005/0270560 A1 * | 12/2005 | Ferlitsch .................... 358/1.15 |

FOREIGN PATENT DOCUMENTS

| JP | A-07-099490 | 4/1995 |
| JP | A-08-097860 | 4/1996 |
| JP | A 08-278862 | 10/1996 |
| JP | A-11-031054 | 2/1999 |
| JP | A 11-305974 | 11/1999 |
| JP | A-2000-101642 | 4/2000 |
| JP | A-2000-207150 | 7/2000 |
| JP | A-2001-339426 | 7/2001 |
| JP | A-2002-032203 | 1/2002 |
| WO | WO 02/092350 A1 | 11/2002 |

\* cited by examiner

*Primary Examiner*—Twyler L. Haskins
*Assistant Examiner*—Fred Guillermety
(74) *Attorney, Agent, or Firm*—Oliff & Berridge, PLC

(57) ABSTRACT

Exemplary embodiments of the present invention provide a network data processing system to reduce traffic and time for the first printout. A client unit generates printing data, which is divided to correspond to respective constituent parts constituting printing contents, and transmits a printing request including header information to a printer. When the printing request is received, the printer analyzes the received printing request, determines whether partial data necessary for constructing the printing data are stored in a storage section, acquires missing partial data from a printer of which a hop count is smallest, stores the acquired partial data in the storage section, and then constructs the printing data on the basis of the partial data of the storage section. Furthermore, the printer retrieves a storage section for the partial data in response to an acquisition request and transmits the detected partial data to the printer.

19 Claims, 16 Drawing Sheets

NETWORK DATA PROCESSING SYSTEM, NETWORK PRINTING SYSTEM, DATA PROCESSOR, PRINTER, DATA PROCESSING PROGRAM, PRINT PROCESSING PROGRAM, NETWORK DATA PROCESSING METHOD, AND NETWORK PRINTING METHOD

BACKGROUND OF THE INVENTION

1. Field of Invention

Exemplary embodiments of the present invention relate to a system, an apparatus, a program, and a method to perform printing through a network, and particularly to a network data processing system, a network printing system, a data processor, a printer, a data processing program, a print processing program, a network data processing method, and a network printing method, which are suitable to reduce the network traffic and the time required for the first printout.

2. Description of Related Art

In the related art, in offices of large companies or in government buildings, etc., it is common that client units such as personal computers assigned to staff members (users) and printers such as color printers or laser printers, are connected and shared through networks such as a LAN. However, in such a situation, the network traffic is typically congested, and there is a significant delay in time to obtain the first printout after the printing request has been made, due to the transmission of massive printing data or concentration of printing requests.

For this reason, related art documents Japanese Unexamined Patent Application Publication No. 8-278862 and Japanese Unexamined Patent Application Publication No. 11-305974 suggest a method of reducing the network traffic and the time required for the first printout by providing a storage section in a printer to store the printing data which have been previously printed by the printer, and by performing the printing process using the printing data stored in the storage section when the same printing request is made in later time.

SUMMARY OF THE INVENTION

In the related art print processing method, when the printing data having the same contents are printed, significant advantages could be obtained. But when a part of the printing data, for example, a part of document data on formats or layouts of a document, or a part of image data or text data combined into the document data are modified, the whole printing data including the modified data part must be transmitted again. Thus, the advantages having reduced network traffic and time required for the first printout could be obtained only in very few circumstances.

The similar problem could be also considered, for example, in the case where a plurality of printers share the same data piece and perform the printing thereof, not limited to a case where a client unit performs the printing through a printer on a network.

Therefore, the present invention relates to consideration of the related art problems discussed above. Exemplary embodiments of the present invention provide a network data processing system, a network printing system, a data processor, a printer, a data processing program, a print processing program, a network data processing method, and a network printing method, which are suitable to reduce the network traffic and time required for the first printout.

(Exemplary Aspect 1) In order to address the related art problems discussed above, a network data processing system according to Exemplary Aspect 1 is a network data processing system having a plurality of data processors connected to a network. The data processor includes a data storage device to store all or a part of process data, which is divided to correspond to constituent parts constituting process contents, in units of divided data, a stored-data retrieving device to retrieve partial data corresponding to the constituent parts from the data storage device in response to an acquisition request from another data processor, a partial-data transmitting device to transmit the partial data detected by the stored-data retrieving device to a data processor serving as a request source, a partial-data acquiring device to acquire the partial data necessary to construct the process data from the other data processor, and a process-data constructing device to construct the process data on the basis of the partial data acquired by the partial-data acquiring device, and the partial-data acquiring device acquiring the partial data from a data processor for which time required for data transmission is shortest or a data processor for which the time required for data transmission is estimated to be shortest, among the plurality of data processors.

According to this exemplary construction, in a data processor A, the partial data necessary to construct the process data are acquired, by the partial-data acquiring device, from the data processor for which the time required for data transmission is shortest or for which the time required for data transmission is estimated to be shortest, among the plurality of data processors. At this time, it is supposed that a data processor B corresponds to the data processor.

In the data processor B, when the acquisition request is received from the data processor A, the partial data are retrieved from the data storage device by the stored-data retrieving device, and the partial data detected through the retrieval are transmitted to the data processor A by the partial-data transmitting device.

In the data processor A, when the necessary partial data are acquired, the process data are constructed on the basis of the acquired partial data by the process-data constructing device.

As a result, when a part of the process data necessary for the processing are different in a data processor, only the different partial data are transmitted through the network, so that it is possible to reduce the traffic compared with the related art case and it is also possible to reduce the time required for the first printout. Further, since the partial data are acquired from the data processor for which the time required for data transmission is shortest or for which the time required for data transmission is estimated to be shortest, among the plurality of data processors, it is possible to perform the acquisition of partial data at relatively-high speed, so that it is possible to further reduce the time required for the first printout.

Here, an example of the data processor for which the time required for data transmission is estimated to be shortest includes a data processor for which a communication distance in the network is shortest, a data processor for which traffic in a communication path is smallest, and a data processor for which a data transmission capacity in a communication path is largest. The communication distance, the traffic, and the data transmission capacity can be obtained through actual measurement or estimation. The actual measurement may be performed during the communication and may be performed in advance. The same is true of a data processor according to Exemplary Aspect 15, a data processing program according to Exemplary Aspect 30, and a network data processing method according to Exemplary Aspect 45.

The data processor may be a printing request unit, a printer, a document editing unit, a printer server, an RIP (Raster Image Processor), and any data processor else. The same is true of the data processor according to Exemplary Aspect 15, the data processing program according to Exemplary Aspect 30, and the network data processing method according to Exemplary Aspect 45.

Examples of a combination of the data processors may include a combination of the plurality of printers, a combination of the document editing unit and the printer, and a combination of the document editing unit, the printing request unit, the RIP and the printer. Of course, these are only examples, the printing request unit, the printer, the document editing unit, the printer server, the RIP, and any data processor else may be combined arbitrarily. The same is true of the network data processing method according to Exemplary Aspect 45.

The data storage device is a device to store data in any device and at any time, may be a device to store data in advance, and may be a device to store data through external input during operation of this system without storing data in advance. The same is true of a network printing system according to Exemplary Aspect 2 or 13, the data processor according to Exemplary Aspect 15, and a printer according to Exemplary Aspect 16 or 28.

(Exemplary Aspect 2) On the other hand, in order to accomplish the aforementioned object, a network printing system according to Exemplary Aspect 2 is a network printing system in which a plurality of printers and a printing request unit to request printing to at least one printer of the plurality of printers are connected to a network, the printing request unit including a printing-data generating device to generate printing data which is divided so as to correspond to constituent parts constituting printing contents, and a printing-request transmitting device to transmit to the printers a printing request, which includes structure information indicating the divided structure of the printing data generated by the printing-data generating device and identification information to identify partial data corresponding to the respective constituent parts. The printer includes a storage device to store all or a part of the printing data in units of divided data, a stored-data retrieving device to retrieve the partial data from the data storage device in response to an acquisition request from another printer, a partial-data transmitting device to transmit the partial data detected by the stored-data retrieving device to a printer as a request source, a printing-request receiving device to receive the printing request, a data-storage determining device to analyze the printing request received by the printing-request receiving device and determining whether partial data necessary to construct the printing data are stored in the data storage device, a partial-data acquiring device to acquire missing partial data to construct the printing data from the other printer on the basis of the determination result of the data-storage determining device, a printing-data constructing device to construct the printing data on the basis of the partial data acquired by the partial-data acquiring device and the partial data in the data storage device, a printing device to perform the printing on the basis of the printing data constructed by the printing-data constructing device, and a stored-data registering device to store the partial data acquired by the partial-data acquiring device in the data storage device, and the partial-data acquiring device acquiring the partial data from a printer for which time required for data transmission is shortest or a printer for which the time required for data transmission is estimated to be shortest, among the plurality of printers.

According to this exemplary construction, in the printing request unit, when the printing data are generated by the printing-data generating device, the printing request including the structure information of the generated printing data and the identification information of the respective partial data are transmitted to, for example, a printer A by the printing-request transmitting device.

In the printer A, when the printing request is received by the printing-request receiving device, the received printing request is analyzed and the partial data necessary to construct the printing data are stored in the data storage device, by the data-storage determining device, and the missing partial data to construct the printing data are acquired, by the partial-data acquiring device, from the printer for which the time required for data transmission is shortest or for which the time required for data transmission is estimated to be shortest, among the plurality of printers. At this time, it is supposed that a printer B corresponds to the printer.

In the printer B, when the acquisition request is received from the printer A, the partial data are retrieved from the data storage device by the stored-data retrieving device, and the partial data detected through the retrieval are transmitted to the printer A by the partial-data transmitting device.

In the printer A, when the missing partial data are acquired, the acquired partial data are stored in the data storage device by the stored-data registering device, and the printing data are constructed on the basis of the acquired partial data and the partial data in the data storage device by the printing-data constructing device. The printing is performed by the printing device on the basis of the constructed printing data.

As a result, when a part of the printing data necessary for the printing in the printer are equivalent to the printing data of the data storage device and the other part thereof are different, only the different partial data are transmitted through the network, so that it is possible to reduce the traffic compared with the related art case and it is also possible to reduce the time required for the first printout. Further, since the partial data are acquired from the printer for which the time required for data transmission is shortest or for which the time required for data transmission is estimated to be shortest, among the plurality of printers, it is possible to perform the acquisition of partial data at relatively-high speed, so that it is possible to further reduce the time required for the first printout.

Here, an example of the printer for which the time required for data transmission is estimated to be shortest may include a printer for which a communication distance in the network is shortest, a printer for which traffic in a communication path is smallest, and a printer for which a data transmission capacity in a communication path is largest. The communication distance, the traffic, and the data transmission capacity can be obtained through actual measurement or estimation. The actual measurement may be performed during the communication and may be performed in advance. The same is true of a printer according to Exemplary Aspect 16, a printing program according to Exemplary Aspect 31, and a network printing method according to Exemplary Aspect 46.

(Exemplary Aspect 3) A network printing system according to Exemplary Aspect 3 is the network printing system according to Exemplary Aspect 2, the printer using the plurality of printers as data acquisition sources, respectively, and further includes a hop-count information storage device to store hop-count information, which indicates a hop count that is the number of connection stages of repeaters in a communication path with each data acquisition source, corresponding to the corresponding data acquisition source, and the partial-data acquiring device reading out the hop-count information corresponding to each data acquisition source from the hop-count information storage device, selecting a data acquisition source whose the hop count is smallest among the data acquisition sources, on the basis of the read-out hop-count information, and transmitting the acquisition request to the selected data acquisition source, thereby acquiring the partial data.

According to this construction, in the printer, the hop-count information corresponding to each data acquisition source is read out from the hop-count information storage device, the data acquisition source of which the hop count is smallest among the plurality of data acquisition sources is selected on the basis of the read-out hop-count information, and the acquisition request is transmitted to the selected data acquisition source, by the partial-data acquiring device, thereby acquiring the partial data.

As a result, since the partial data are acquired from the printer for which the communication distance in the network is shortest, among the plurality of printers, it is possible to perform the acquisition of partial data at relatively-high speed, so that it is possible to accomplish reduction in time for the first printout.

Here, The hop-count information storage device is a device to store the hop-count information in any device and at any time, may be a device to store the hop-count information in advance, and may be device to store the hop-count information through external input, etc. during operation of this system without storing the hop-count information in advance. The same is true of a printer according to Exemplary Aspect 18.

The hop count may be measured in advance and the measurement result may be stored as the hop-count information in the hop-count information storage device. Alternatively, the hop count may be dynamically measured during operation of this system and the measurement result may be stored as the hop-count information in the hop-count information storage device. The same is true of the printer according to Exemplary Aspect 18.

(Exemplary Aspect 4) A network printing system according to Exemplary Aspect 4 is the network printing system according to Exemplary Aspect 3, wherein the hop-count information storage device stores the hop-count information indicating the number of connection stages of repeaters in a communication path to each data acquisition source and communication-path information specifying the communication path, corresponding to the corresponding data acquisition source, and the partial-data acquiring device transmitting the acquisition request to the selected data acquisition source and acquiring the partial data through the communication path specified on the basis of the communication-path information corresponding to the data acquisition source.

According to this construction, in the printer, the acquisition request is transmitted to the selected data acquisition source and the partial data are acquired through the communication path specified on the basis of the communication-path information corresponding to the data acquisition source, by the partial-data acquiring device.

As a result, it is possible to more surely acquire the partial data from the printer for which the communication distance in the network is shortest, among the plurality of printers.

(Exemplary Aspect 5) A network printing system according to Exemplary Aspect 5 is the network printing system according to Exemplary Aspect 2, wherein the printer uses the plurality of printers as data acquisition sources, respectively, and further includes an arrival-time information storage device to store arrival-time information, which indicates an arrival time of a packet at each data acquisition source, corresponding to the corresponding data acquisition source, and the partial-data acquiring device reads out the arrival-time information corresponding to each data acquisition source from the arrival-time information storage device, selects a data acquisition source whose arrival time is shortest, among the plurality of data acquisition sources, on the basis of the read-out arrival-time information, and transmits the acquisition request to the selected data acquisition source, thereby acquiring the partial data.

According to this construction, in the printer, the arrival-time information corresponding to each data acquisition source is read out from the arrival-time information storage device, the data acquisition source of which the arrival time is shortest, among the plurality of data acquisition sources is selected on the basis of the read-out arrival-time information, and the acquisition request is transmitted to the selected data acquisition source, by the partial-data acquiring device, thereby acquiring the partial data.

As a result, since the partial data are acquired from the printer for which the communication time in the network is shortest, among the plurality of printers, it is possible to perform the acquisition of partial data at relatively high speed, so that it is possible to reduce the time required for the first printout.

Here, the arrival-time information storage device is a device to store the arrival-time information in any device and at any time, may be a device to store the arrival-time information in advance, and may be device to store the arrival-time information through external input, etc. during operation of this system without storing the arrival-time information in advance. The same is true of a printer according to Exemplary Aspect 20.

The arrival time may be measured in advance and the measurement result may be stored as the arrival-time information in the arrival-time information storage device. Alternatively, the arrival time may be dynamically measured during operation of this system and the measurement result may be stored as the arrival-time information in the arrival-time information storage device. The same is true of the printer according to Exemplary Aspect 20.

(Exemplary Aspect 6) A network printing system according to Exemplary Aspect 6 is the network printing system according to Exemplary Aspect 5, wherein the arrival-time information storage device storing the arrival-time information indicating the arrival time of a packet at each data acquisition source and communication-path information specifying a communication path to each data acquisition source corresponding to the corresponding data acquisition source, and the partial-data acquiring device transmitting the acquisition request to the selected data acquisition source and acquiring the partial data through the communication path specified on the basis of the communication-path information corresponding to the selected data acquisition source.

According to this construction, in the printer, the acquisition request is transmitted to the selected data acquisition source and the partial data are acquired through the communication path specified on the basis of the communication-path information corresponding to the data acquisition source, by the partial-data acquiring device.

As a result, it is possible to more surely acquire the partial data from the printer for which the communication time in the network is shortest, among the plurality of printers.

(Exemplary Aspect 7) A network printing system according to Exemplary Aspect 7 is the network printing system according to any one of Exemplary Aspects 2 to 6, each printer further including first a data managing device to manage the partial data stored in the data storage device, a second data managing device to manage the partial data, and an address-information storage device to store address information, the stored-data registering device storing the respective partial data constituting the printing data in the data storage device corresponding to identification information identifying the partial data, the second data managing device acquiring the identification information identifying the partial data necessary for constructing the printing data and broadcasting a data-existence confirmation request including the acquired identification information, and when a data-existence response indicating that the partial data exist is received, the second data managing device registers the address information of the transmission source of the data-existence response in the address-information storage device, when the data-existence confirmation request is received, the first data managing device retrieving the same identification information as the identification information included in the received data-existence confirmation request from the data storage device, and when the identification information is detected, the first data managing device transmitting the data-existence response to the printer as the transmission source, and the partial-data acquiring device reading out the address information corresponding to an acquisition source of the partial data from the address-information storage device, and transmitting the acquisition request to the data acquisition source on the basis of the read-out address information, thereby acquiring the partial data.

According to this construction, the respective partial data constituting the printing data are stored in the data storage device corresponding to the identification information identifying the respective partial data, by the stored-data registering device.

In the printer A, the identification information identifying the partial data necessary for constructing the printing data are acquired and the data-existence confirmation request including the acquired identification information is broadcasted, by the second data managing device.

In the printer B, when the data-existence confirmation request is received, the same identification information as the identification information included in the received data-existence confirmation request is retrieved from the data storage device by the first data managing device. As a result, when the corresponding identification information is retrieved, the data-existence response indicating that the partial data exist is transmitted to the printer A.

In the printer A, when the data-existence response is received, the address information of the transmission source of the received data-existence response is registered in the address-information storage device by the second data managing device. When the partial data necessary for constructing the printing data are acquired, the address information corresponding to the acquisition source of the partial data is read out from the address-information storage device and the acquisition request is transmitted to the data acquisition source on the basis of the read-out address information, by the partial-data acquiring device, thereby acquiring the partial data.

Here, the second data managing device acquires the identification information identifying the partial data necessary for constructing the printing data. More specifically, since the identification information is included in the printing request, the identification information can be acquired from the printing request received by the printing-request receiving device. In addition, the identification information may be acquired by generating the identification information independently. The same is true of a printer according to Exemplary Aspect 22.

The address information storage device is a device to store the address information in any device and at any time, may be a device to store the address information in advance, and may store the address information through external input, etc. during operation of this system without storing the address information in advance. The same is true of a network printing system according to any one of Exemplary Aspects 8, 9 and 11 and a printer according to any one of Exemplary Aspects 22 to 24 and 26.

(Exemplary Aspect 8) A network printing system according to Exemplary Aspect 8 is the network printing system according to any one of Exemplary Aspects 2 to 6, the printer further including a first data managing device to manage the partial data stored in the data storage device a, second data managing device to manage the partial data, and an address-information storage device to store address information, the stored-data registering device storing the respective partial data constituting the printing data in the data storage device corresponding to identification information identifying the respective partial data, the first data managing device reading out the identification information corresponding to the respective partial data in the data storage device from the data storage device, and broadcasts a data-existence notification including the read-out identification information, when the data-existence notification is received, the second data managing device registering the address information of the transmission source of the data-existence notification in the address-information storage device corresponding to the identification information included in the received data-existence notification, and the partial-data acquiring device acquiring the identification information identifying the respective partial data necessary for constructing the printing data, reading out the address information corresponding to the acquired identification information from the address-information storage device, and transmitting the acquisition request to an acquisition source of the partial data on the basis of the read-out address information, thereby acquiring the partial data.

According to this construction, in the printer B, the respective partial data constituting the printing data are stored in the data storage device corresponding to the identification information identifying the respective partial data by the stored-data registering device. In addition, the identification information corresponding to the respective partial data in the data storage device is read out from the data storage device and the data-existence notification including the read-out identification information is broadcasted, by the first data managing device.

In the printer A, when the data-existence notification is received, the address information of the transmission source of the received data-existence notification is registered in the address-information storage device corresponding to the identification information included in the received data-existence notification, by the second data managing device. When the partial data necessary for constructing the printing data are acquired, the identification information identifying the partial data necessary for constructing the printing data are acquired, the address information corresponding to the acquired identification information is read out from the address-information storage device, and the acquisition request is transmitted to the acquisition source of the partial data on the basis of the read-out address information, by the partial-data acquiring device, thereby acquiring the partial data.

Here, the partial-data acquiring device acquires the identification information identifying the partial data necessary for constructing the printing data. More specifically, since the identification information is included in the printing request, the identification information can be acquired from the printing request received by the printing-request receiving device. In addition the identification information may be acquired by generating the identification information independently. The same is true of a network printing system according to Exemplary Aspect 9 or 11 and a printer according to any one of Exemplary Aspects 23, 24 and 26.

(Exemplary Aspect 9) A network printing system according to Exemplary Aspect 9 is the network printing system according to any one of Exemplary Aspects 2 to 6, the printer further including first data managing device to manage the partial data stored in the data storage device and an address-information storage device to store address information, the first data managing device using the plurality of printers as data acquisition sources, respectively, and registers the address information of the data acquisition source storing the partial data in the address-information storage device corresponding to identification information identifying the partial data, and when a data-existence confirmation request including the identification information is received, the first data managing device reading out the address information corresponding to the identification information included in the received data-existence confirmation request from the address-information storage device and transmitting a data-existence response including the read-out address information to the printer as a request source, and wherein the partial-data acquiring device acquiring the identification information identifying the corresponding partial data necessary for constructing the printing data and transmitting a data-existence confirmation request including the acquired identification information to the data acquisition source, and when the data-existence response is received, the partial-data acquiring device transmitting the acquisition request to the data acquisition source on the basis of the address information included in the received data-existence response, thereby acquiring the partial data.

According to this construction, in the printer, the address information of the data acquisition source storing the partial data is registered in the address information storage device corresponding to the identification information identifying the partial data.

In the printer A, the identification information identifying the partial data necessary for constructing the printing data is acquired and the data-existence confirmation request including the acquired identification information is transmitted to, for example, the printer B, by the partial-data acquiring device.

In the printer B, when the data-existence confirmation request is received, the address information corresponding to the identification information included in the received data-existence confirmation request is read out from the address-information storage device and the data-existence response including the read-out address information is transmitted to the printer A, by the first data managing device.

In the printer A, when the data-existence response is received, the acquisition request is transmitted to the data acquisition source on the basis of the address information included in the received data-existence response, by the partial-data acquiring device, thereby acquiring the partial data.

As a result, since the partial data stored in the data acquisition source is managed by the printer, the printer can acquire the partial data stored in the data acquisition source, only by referring to another printer.

(Exemplary Aspect 10) A network printing system according to Exemplary Aspect 10 is the network printing system according to Exemplary Aspect 9, the first data managing device acquiring the identification information identifying the partial data stored in the data storage device, and registering the address information of the corresponding printer in the address-information storage device corresponding to the acquired identification information.

According to this construction, in the printer, the identification information identifying the partial data stored in the data storage device is acquired and its own address information is registered in the address-information storage device corresponding to the acquired identification information.

As a result, since the partial data stored in another printer are managed by the printer, it is possible to acquire the partial data stored in another printer, only by referring to the printer.

Here, the first data managing device acquires the identification information identifying the partial data stored in the data storage device. More specifically, since the identification information is included in the printing request, the identification information can be acquired from the printing request transmitted by the printing-request transmitting device. When the identification information included in the printing request is stored in the data storage device together with the corresponding partial data, the identification information can be acquired from the data storage device. In addition, the identification information may be acquired by generating the identification information independently. The same is true of a network printing system according to Exemplary Aspect 12 and a printer according to Exemplary Aspect 25 or 27.

(Exemplary Aspect 11) A network printing system according to Exemplary Aspect 11 is the network printing system according to any one of Exemplary Aspects 2 to 6, wherein the plurality of printers are used as data acquisition sources, respectively, and a data managing terminal to manage the stored data of the data acquisition sources is connected to the network, the data managing terminal has a data managing device to manage the stored data of the data acquisition sources and address-information storage device to store address information, the data managing device registering the address information of the data acquisition source storing the partial data in the address-information storage device corresponding to identification information identifying the respective partial data, and when a data-existence confirmation request including the identification information is received, the data managing device reading out the address information corresponding to the identification information included in the received data-existence confirmation request from the address-information storage device and transmitting a data-existence response including the read-out address information to a printer as a request source, and the partial-data acquiring device acquiring the identification information identifying the respective partial data necessary for constructing the printing data and transmitting a data-existence confirmation request including the acquired identification information to the data managing terminal, and when the data-existence response is received, the partial-data acquiring device transmitting the acquisition request to the data acquisition source on the basis of the address information included in the received data-existence response, thereby acquiring the partial data.

According to this construction, in the data managing terminal, the address information of the data acquisition source storing the partial data is registered in the address-information storage device corresponding to the identification information identifying the partial data by the data managing device.

In the printer A, the identification information identifying the partial data necessary for constructing the printing data is acquired and the data-existence confirmation request including the acquired identification information is transmitted to the data managing terminals, by the partial-data acquiring device.

In the data managing terminal, when the data-existence confirmation request is received, the address information corresponding to the identification information included in the received data-existence confirmation request is read out from the address-information storage device and the data-existence response including the read-out address information is transmitted to the printer A, by the data managing device.

In the printer A, when the data-existence response is received, the acquisition request is transmitted to the data acquisition source on the basis of the address information included in the received data-existence response by the partial-data acquiring device, thereby acquiring the partial.

As a result, since the partial data stored in the data acquisition source are managed by the data managing terminal, the printer can acquire the partial data stored in the data acquisition source, by only referring to the data managing terminal.

(Exemplary Aspect 12) A network printing system according to Exemplary Aspect 12 is the network printing system according to Exemplary Aspect 11, the printer further including a first data managing device to manage the partial data stored in the data storage device, the first data managing device acquiring identification information identifying the respective partial data stored in the data storage device and transmitting a data-existence notification including the acquired identification information to the data managing terminal, and when the data-existence notification is received, the data managing device registering the address information of the transmission source of the data-existence notification in the address-information storage device corresponding to the identification information included in the received data-existence notification.

According to this construction, the identification information identifying the partial data stored in the data storage device is acquired and the data-existence notification including the acquired identification information is transmitted to the data managing terminal, by the first data managing device.

In the data managing terminal, when the data-existence notification is received, the address information of the transmission source of the data-existence notification is registered in the address-information storage device corresponding to the identification information included in the received data-existence notification by the data managing device.

As a result, since the partial data stored in the printer are managed by the data managing terminal, the printer can acquire the partial data stored in another printer, by only referring to the data managing terminal.

(Exemplary Aspect 13) A network printing system according to Exemplary Aspect 13 is a network printing system in which a plurality of printers and a printing request unit for requesting printing to at least one printer of the plurality of printers are connected to a network, the printing request unit including a printing-data generating device to generate printing data which is divided so as to correspond to constituent parts constituting printing contents, and a printing-request transmitting device to transmit to the printers a printing request, which includes structure information indicating the divided structure of the printing data generated by the printing-data generating device and identification information for identifying partial data corresponding to the respective constituent parts, the printer including a data storage device to store all or a part of the printing data in units of divided data, a stored-data retrieving device to retrieve the partial data from the data storage device in response to an acquisition request from another printer, partial-data transmitting device to transmit the partial data detected by the stored-data retrieving device to a printer as a request source, printing-request receiving device to receive the printing request, data-storage determining device to analyze the printing request received by the printing-request receiving device and determining whether partial data necessary for constructing the printing data are stored in the data storage device, partial-data acquiring device to acquire missing partial data for constructing the printing data from the other printers on the basis of the determination result of the data-storage determining device, printing-data constructing device to construct the printing data on the basis of the partial data acquired by the partial-data acquiring device and the partial data in the data storage device, printing device to perform the printing on the basis of the printing data constructed by the printing-data constructing device, stored-data registering device to store the partial data acquired by the partial-data acquiring device in the data storage device, and communication-cost information storage device which uses the plurality of printers as data acquisition sources, respectively, and stores communication-cost information indicating communication cost required for communication with corresponding data acquisition source corresponding to the corresponding data acquisition source, and the partial-data acquiring device reading out the communication-cost information corresponding to the respective data acquisition sources from the communication-cost information storage device, selecting a data acquisition source whose communication cost is smallest among the plurality of data acquisition sources, on the basis of the read-out communication-cost information, and transmitting the acquisition request to the selected data acquisition source, thereby acquiring the partial data.

According to this construction, in the printing request unit, when the printing data are generated by the printing-data generating device, the printing request including the structure information of the generated printing data and the identification information of the respective partial data is transmitted to, for example, a printer A by the printing-request transmitting device.

In the printer A, when the printing request is received by the printing-request receiving device, the received printing request is analyzed and it is determined whether the partial data necessary for constructing the printing data are stored in the data storage device, by the data-storage determining device. Then, on the basis of the determination result, the missing partial data for constructing the printing data are acquired from another printer by the partial-data acquiring device. In acquiring the partial data, the communication-cost information corresponding to each data acquisition source is read out from the communication-cost storage device, the data acquisition source whose communication cost is smallest among the plurality of data acquisition sources is selected on the basis of the read-out communication-cost information, and the acquisition request is transmitted to the selected data acquisition source, by the partial-acquiring, thereby acquiring the partial data. At this time, it is supposed that a printer B corresponds to the selected data acquisition source.

In the printer B, when the acquisition request is received from the printer A, the partial data are retrieved from the data storage device by the stored-data retrieving device, and the partial data detected through the retrieval are transmitted to the printer A by the partial-data transmitting device.

In the printer A, when the missing partial data are acquired, the acquired partial data are stored in the data storage device by the stored-data registering device, and the printing data are constructed on the basis of the acquired partial data and the partial data in the datastorage device by the printing-data constructing device. The printing is performed on the basis of the constructed printing data by the printing device.

As a result, when a part of the printing data necessary for the printing in the printer are equivalent to the printing data of the data storage device and the other part thereof are different therefrom, only the different partial data are transmitted through the network, so that it is possible to reduce the traffic compared with the related art case and it is also possible to reduce the time required for the first printout. Further, since the partial data are acquired from the printer for which the communication cost is smallest among the plurality of printers, it is possible to relatively reduce the printing cost.

Here, the communication-cost information storage device is a device to store the communication-cost information in any device and at any time, may store the communication-cost information in advance, and may store the communication-cost information through external input, etc. during operation of this system without storing communication-cost information in advance. The same is true of a printer according to Exemplary Aspect 28.

Further, the communication cost may be measured in advance and the measurement result may be stored as the communication-cost information in the communication-cost information storage device. Alternatively, the communication cost may be measured dynamically during operation of this system and the measurement result may be stored as the communication-cost information in the communication-cost information storage device. The same is true of the printer according to Exemplary Aspect 28.

(Exemplary Aspect 14) A network printing system according to Exemplary Aspect 14 is the network printing system according to Exemplary Aspect 13, the communication-cost information storage device storing the communication-cost information indicating the communication cost required for communication with the corresponding data acquisition source and communication-path information specifying the communication path to the corresponding data acquisition source corresponding to the corresponding data acquisition source, and the partial-data acquiring device transmitting the acquisition request to the selected data acquisition source and acquiring the partial data through the communication path specified on the basis of the communication-path information corresponding to the selected data acquisition source.

According to this construction, in the printer, the acquisition request is transmitted to the selected data acquisition source and the partial data are acquired through the communication path specified on the basis of the communication-path information corresponding to the selected data acquisition source, by the partial-data acquiring device.

As a result, it is possible to more surely acquire the partial data from the printer for which the communication cost is smallest among the plurality of printers.

(Exemplary Aspect 15) On the other hand, in order to accomplish the aforementioned object, a data processor according to Exemplary Aspect 15 is a data processor including: a data storage device to store all or a part of process data, which is divided to correspond to respective constituent parts constituting process contents, in units of divided data; a stored-data retrieving device to retrieve partial data corresponding to the constituent parts from the data storage device in response to an acquisition request from another data processor; a partial-data transmitting device to transmit the partial data detected by the stored-data retrieving device to the other data processor as a request source; a partial-data acquiring device to acquire the partial data necessary for constructing the process data from the other data processor; and a process-data constructing device to construct the process data on the basis of the partial data acquired by the partial-data acquiring device, the partial-data acquiring device acquiring the partial data from a data processor for which time required for data transmission is shortest or for which the time required for data transmission is estimated to be shortest, among a plurality of the data processors.

According to this construction, the same operation as the data processor in the network data processing system according to Exemplary Aspect 1 can be obtained. Therefore, the same advantages as the network data processing system according to Exemplary Aspect 1 can be obtained.

(Exemplary Aspect 16) On the other hand, in order to accomplish the aforementioned object, a printer according to Exemplary Aspect 16 is a printer including: a data storage device to store all or a part of printing data, which are divided to correspond to respective constituent parts constituting printing contents, in units of divided data; a stored-data retrieving device to retrieve partial data corresponding to the constituent parts from the data storage device in response to an acquisition request from another printer; a partial-data transmitting device to transmit the partial data detected by the stored-data retrieving device to a printer as a request source; a partial-data acquiring device to acquire the partial data necessary for constructing the printing data from the other printer; a printing-data constructing device to construct the printing data on the basis of the partial data acquired by the partial-data acquiring device; and a printing device to perform the printing on the basis of the printing data constructed by the printing-data constructing device, the partial-data acquiring device acquiring the partial data from a printer for which time required for data transmission is shortest or for which the time required for data transmission is estimated to be shortest, among a plurality of the printers.

According to this construction, the partial data necessary for constructing the printing data are acquired from the printer for which the time required for data transmission is shortest or for which the time required for data transmission is estimated to be shortest, among the plurality of printers, by the partial-data acquiring device. When the necessary partial data are acquired, the printing data are constructed on the basis of the acquired partial data by the printing-data constructing device. Then, the printing is performed on the basis of the constructed printing data by the printing device.

On the other hand, when the acquisition request is received by another printer, the partial data are retrieved from the data storage device by the stored-data retrieving device, and the partial data detected through the retrieval are transmitted to the printer as the request source.

As a result, when a part of the printing data necessary for the printing in the printer are different, only the different partial data are transmitted through the network, so that it is possible to reduce the traffic and it is also possible to reduce the time required for the first printout, compared with the related art case. In addition, since the partial data are acquired from the printer for which the time required for data transmission is shortest or for which the time required for data transmission is estimated to be shortest, among the plurality of printers, the acquisition of the partial data can be performed at relatively-high speed, so that it is possible to further reduce the time for the first printout.

(Exemplary Aspect 17) A printer according to Exemplary Aspect 17 is the printer according to Exemplary Aspect 16, further including: a printing-request receiving device to receive a printing request which includes structure information indicating the divided structure of the printing data and identification information identifying the partial data corresponding to the respective constituent parts; a data-storage determining device to analyze the printing request received by the printing-request receiving device and determining whether the partial data necessary for constructing the printing data are stored in the data storage device, and a stored-data registering device to store the partial data acquired by the partial-data acquiring device in the data storage device, the partial-data acquiring device acquiring the missing partial data for constructing the printing data from another printer on the basis of the determination result of the data-storage determining device, and the printing-data constructing device constructing the printing data on the basis of the partial data acquired by the partial-data acquiring device and the partial data in the data storage device.

According to this construction, when the printing request is received by the printing-request receiving device, the received printing request is analyzed and it is determined whether the partial data necessary for constructing the printing data are stored in the data storage device, by the data-storage determining device. On the basis of the determination result, the missing partial data for constructing the printing data are acquired by the partial-data acquiring device from the printer for which the time required for data transmission is shortest or for which the time required for data transmission is estimated to be shortest, among the plurality of printers. When the missing partial data are acquired, the printing data are constructed by the printing-data constructing device on the basis of the acquired partial data and the partial data in the data storage device. The printing is performed on the basis of the constructed printing data by the printing device.

As a result, when a part of the printing data necessary for the printing in the printer are equivalent to the printing data of the data storage device and the other part thereof are different therefrom, only the different partial data are transmitted through the network, so that it is possible to reduce the traffic and it is also possible to reduce the time for the first printout.

(Exemplary Aspect 18) A printer according to Exemplary Aspect 18 is the printer according to Exemplary Aspect 17, the plurality of printers being used as data acquisition sources, respectively, and each printer further includes a hop-count information storage device to store hop-count information, which indicates a hop count as the number of connection stages of repeaters in a communication path with each data acquisition source, corresponding to the corresponding data acquisition source, and the partial-data acquiring device reading out the hop-count information corresponding to each data acquisition source from the hop-count information storage device, selecting a data acquisition source whose the hop count is smallest among the data acquisition sources, on the basis of the read-out hop-count information, and transmitting the acquisition request to the selected data acquisition source, thereby acquiring the partial data.

According to this construction, the same operation as the data processor in the network printing system according to Exemplary Aspect 3 can be obtained. Therefore, the same advantages as the network printing system according to Exemplary Aspect 3 can be obtained.

(Exemplary Aspect 19) A printer according to Exemplary Aspect 19 is the printer according to Exemplary Aspect 18, the hop-count information storage device storing the hop-count information indicating the number of connection stages of repeaters in a communication path to each data acquisition source and communication-path information specifying the communication path, corresponding to the corresponding data acquisition source, and the partial-data acquiring device transmitting the acquisition request to the selected data acquisition source and acquiring the partial data through the communication path specified on the basis of the communication-path information corresponding to the data acquisition source.

According to this construction, the same operation as the data processor in the network printing system according to Exemplary Aspect 4 can be obtained. Therefore, the same advantages as the network printing system according to Exemplary Aspect 4 can be obtained.

(Exemplary Aspect 20) A printer according to Exemplary Aspect 20 is the printer according to Exemplary Aspect 17, each printer using the plurality of printers as data acquisition sources, respectively, and further includes an arrival-time information storage device to store arrival-time information, which indicates an arrival time of a packet at each data acquisition source, corresponding to the corresponding data acquisition source, and the partial-data acquiring device reading out the arrival-time information corresponding to each data acquisition source from the arrival-time information storage device, selecting a data acquisition source whose arrival time is shortest, among the plurality of data acquisition sources, on the basis of the read-out arrival-time information, and transmitting the acquisition request to the selected data acquisition source, thereby acquiring the partial data.

According to this construction, the same operation as the data processor in the network printing system according to Exemplary Aspect 5 can be obtained. Therefore, the same advantages as the network printing system according to Exemplary Aspect 5 can be obtained.

(Exemplary Aspect 21) A printer according to Exemplary Aspect 21 is the printer according to Exemplary Aspect 20, the arrival-time information storage device storing the arrival-time information indicating the arrival time of a packet at each data acquisition source and communication-path information specifying the communication path to each data acquisition source corresponding to the corresponding data acquisition source, and the partial-data acquiring device transmitting the acquisition request to the selected data acquisition source and acquiring the partial data through the communication path specified on the basis of the communication-path information corresponding to the selected data acquisition source.

According to this construction, the same operation as the data processor in the network printing system according to Exemplary Aspect 6 can be obtained. Therefore, the same advantages as the network printing system according to Exemplary Aspect 6 can be obtained.

(Exemplary Aspect 22) A printer according to Exemplary Aspect 22 is the printer according to any one of Exemplary Aspects 17 to 21, further including a first data managing device to manage the partial data stored in the data storage device, a second data managing device to manage the partial data, and an address-information storage device for storing address information, the stored-data registering device storing the respective partial data constituting the printing data in the data storage device corresponding to identification information identifying the respective partial data, the second data managing device acquiring the identification information identifying the partial data necessary for constructing the printing data and broadcasts a data-existence confirmation request including the acquired identification information, and when a data-existence response indicating that the partial data exist is received, the second data managing device registering the address information of the transmission source of the data-existence response in the address-information storage device, when the data-existence confirmation request is received, the first data managing device retrieving the same identification information as the identification information included in the received data-existence confirmation request from the data storage device, and when the identification information is retrieved, the first data managing device transmitting the data-existence response to the printer as the transmission source, and the partial-data acquiring device reading out the address information corresponding to an acquisisource of the partial data from the address-information storage device, and transmitting the acquisition request to the data acquisition source on the basis of the read-out address information, thereby acquiring the partial data.

According to this construction, the same operation as the data processor in the network printing system according to Exemplary Aspect 7 can be obtained. Therefore, the same advantages as the network printing system according to Exemplary Aspect 7 can be obtained.

(Exemplary Aspect 23) A printer according to Exemplary Aspect 23 is the printer according to any one of Exemplary Aspects 17 to 21, the printer further including a first data managing device to manage the partial data stored in the data storage device, a second data managing device to manage the partial data, and address-information storage device to store address information, the stored-data registering device storing the respective partial data constituting the printing data in the data storage device corresponding to identification information identifying the respective partial data, the first data managing device reading out the identification information corresponding to the respective partial data in the data storage device from the data storage device, and broadcasting a data-existence notification including the read-out identification information, when the data-existence notification is received, the second data managing device registering the address information of the transmission source of the data-existence notification in the address-information storage device corresponding to the identification information included in the received data-existence notification, and the partial-data acquiring device acquiring the identification information identifying the respective partial data necessary for constructing the printing data, reads out the address information corresponding to the acquired identification information from the address-information storage device, and transmitting the acquisition request to an acquisition source of the partial data on the basis of the read-out address information, thereby acquiring the partial data.

According to this construction, the same operation as the data processor in the network printing system according to Exemplary Aspect 8 can be obtained. Therefore, the same advantages as the network printing system according to Exemplary Aspect 8 can be obtained.

(Exemplary Aspect 24) A printer according to Exemplary Aspect 24 is the printer according to any one of Exemplary Aspects 17 to 21, each printer further including a first data managing device to manage the partial data stored in the data storage device and an address-information storage device to store address information, the first data managing device using the plurality of printers as data acquisition sources, respectively, and registering the address information of the data acquisition source storing the partial data in the address-information storage device corresponding to identification information identifying the partial data, and when a data-existence confirmation request including the identification information is received, the first data managing device reading out the address information corresponding to the identification information included in the received data-existence confirmation request from the address-information storage device and transmitting a data-existence response including the read-out address information to the printer as a request source, and the partial-data acquiring device acquiring the identification information identifying the respective partial data necessary for constructing the printing data and transmitting a data-existence confirmation request including the acquired identification information to the data acquisition source, and when the data-existence response is received, the partial-data acquiring device transmitting the acquisition request to the data acquisition source on the basis of the address information included in the received data-existence response, thereby acquiring the partial data.

According to this construction, the same operation as the data processor in the network printing system according to Exemplary Aspect 9 can be obtained. Therefore, the same advantages as the network printing system according to Exemplary Aspect 9 can be obtained.

(Exemplary Aspect 25) A printer according to Exemplary Aspect 25 is the printer according to Exemplary Aspect 24, the first data managing device acquiring the identification information identifying the partial data stored in the data storage device, and registering the address information of the corresponding printer in the address-information storage device corresponding to the acquired identification information.

According to this construction, the same operation as the data processor in the network printing system according to Exemplary Aspect 10 can be obtained. Therefore, the same advantages as the network printing system according to Exemplary Aspect 10 can be obtained.

(Exemplary Aspect 26) A printer according to Exemplary Aspect 26 is the printer according to any one of Exemplary Aspects 17 to 21, the partial-data acquiring device acquiring the identification information identifying the respective partial data necessary for constructing the printing data and transmitting a data-existence confirmation request including the acquired identification information to the data managing terminal, and when the data-existence response is received, the partial-data acquiring device transmitting the acquisition request to the data acquisition source on the basis of the address information included in the received data-existence response, thereby acquiring the partial data.

According to this construction, the same operation as the data processor in the network printing system according to Exemplary Aspect 11 can be obtained. Therefore, the same advantages as the network printing system according to Exemplary Aspect 11 can be obtained.

(Exemplary Aspect 27) A printer according to Exemplary Aspect 27 is the printer according to Exemplary Aspect 26, further including a first data managing device to manage the partial data stored in the data storage device, the first data managing device acquiring identification information identifying the respective partial data stored in the data storage device and transmitting a data-existence notification including the acquired identification information to the data managing terminal.

According to this construction, the same operation as the data processor in the network printing system according to Exemplary Aspect 12 can be obtained. Therefore, the same advantages as the network printing system according to Exemplary Aspect 12 can be obtained.

(Exemplary Aspect 28) A printer according to Exemplary Aspect 28 is a printer including: a data storage device to store all or a part of printing data, which are divided to correspond to respective constituent parts constituting printing contents, in units of divided data; a stored-data retrieving device to retrieve partial data corresponding to the constituent parts from the data storage device in response to an acquisition request from another printer; a partial-data transmitting device to transmit the partial data detected by the stored-data retrieving device to the other printer as a request source; a partial-data acquiring device to acquire the partial data necessary for constructing the printing data from the other printer; printing-data constructing device to construct the printing data on the basis of the partial data acquired by the partial-data acquiring device; printing device to perform printing on the basis of the printing data constructed by the printing-data constructing device; and a communication-cost information storage device which uses a plurality of the printers as data acquisition sources, respectively, and stores communication-cost information indicating communication cost required for communication with each data acquisition source corresponding to the corresponding data acquisition source, the partial-data acquiring device reading out the communication-cost information corresponding to the respective data acquisition sources from the communication-cost information storage device, selecting a data acquisition source whose communication cost is smallest among the plurality of data acquisition sources, on the basis of the read-out communication-cost information, and transmits the acquisition request to the selected data acquisition source, thereby acquiring the partial data.

According to this construction, the missing partial data for constructing the printing data are acquired from another printer by the partial-data acquiring device. In acquiring the partial data, by the partial-data acquiring device, the communication-cost information corresponding to the respective data acquisition sources is read out from the communication-cost information storage device, a data acquisition source whose communication cost is smallest among the plurality of data acquisition sources is selected on the basis of the read-out communication-cost information, and the acquisition request is transmitted to the selected data acquisition source, thereby acquiring the partial data. When the necessary partial data are acquired, the printing data are constructed on the basis of the acquired partial data by the printing-data constructing device. The printing is performed on the basis of the constructed printing data by the printing device.

On the other hand, when the acquisition request is received from another printer, the partial data are retrieved from the data storage device by the stored-data retrieving device, and the partial data detected through the retrieval are transmitted to the printer as the acquisition source by the partial-data transmitting device.

As a result, when a part of the printing data necessary for the printing in the printer are equivalent to the printing data of the data storage device and the other part thereof are different therefrom, only the different partial data are transmitted through the network, so that it is possible to reduce the traffic and it is also possible to reduce the time required for the first printout. In addition, since the partial data are acquired from the printer for which the communication cost smallest among the plurality of printers, it is possible to relatively reduce the printing cost.

(Exemplary Aspect 29) A printer according to Exemplary Aspect 29 is the printer according to Exemplary Aspect 28, the communication-cost information storage device storing the communication-cost information indicating the communication cost required for communication with the corresponding data acquisition source and communication-path information specifying the communication path to the corresponding data acquisition source corresponding to the corresponding data acquisition source, and the partial-data acquiring device transmitting the acquisition request to the selected data acquisition source and acquiring the partial data through the communication path specified on the basis of the communication-path information corresponding to the selected data acquisition source.

According to this construction, the same operation as the data processor in the network printing system according to Exemplary Aspect 14 can be obtained. Therefore, the same advantages as the network printing system according to Exemplary Aspect 14 can be obtained.

(Exemplary Aspect 30) On the other hand, in order to accomplish the above object, a data processing program according to Exemplary Aspect 30 is a data processing program which allows a computer to perform a process, the process including retrieving partial data corresponding to respective constituent parts constituting process contents from a data storage device to store all or a part of process data divided to correspond to the respective constituent parts in units of divided data, in response to an acquisition request from another data processor; transmitting the partial data detected in the stored-data retrieving to a data processor serving as a request source; acquiring the partial data necessary for constructing the process data from the other data processor; constructing the process data on the basis of the partial data acquired in the partial-data acquiring, in the partial-data acquiring, the partial data being acquired from a data processor for which time required for data transmission is shortest or for which the time required for data transmission is estimated to be shortest, among a plurality of the data processors.

According to this construction, when the program is read out by the computer and the process is performed by the computer in accordance with the read-out program, the same operation and advantages as the data processor according to Exemplary Aspect 15 can be obtained.

(Exemplary Aspect 31) On the other hand, in order to accomplish the above object, a print processing program according to Exemplary Aspect 31 is a print processing program which allows a computer to perform a process, the process including: retrieving partial data from data storage device to store all or a part of printing data, which are divided to correspond to respective constituent parts constituting printing contents, in units of divided data, in response to an acquisition request from another printer; transmitting the partial data detected in the stored-data retrieving to a printer as a request source; acquiring the partial data necessary for constructing the printing data from the other printer; constructing the printing data on the basis of the partial data acquired in the partial-data acquiring; and performing the printing on the basis of the printing data constructed in the printing-data constructing, in the partial-data acquiring, the partial data are acquired from a printer for which time required for data transmission is shortest or for which the time required for data transmission is estimated to be shortest, among a plurality of the printers.

According to this construction, when the program is read out by the computer and the process is performed by the computer in accordance with the read-out program, the same operation and advantages as the printer according to Exemplary Aspect 16 can be obtained.

(Exemplary Aspect 32) A print processing program according to Exemplary Aspect 32 is the print processing program according to Exemplary Aspect 31, which allows a computer to perform a process, the process including: receiving a printing request which includes structure information indicating the divided structure of the printing data and identification information identifying the partial data corresponding to the respective constituent parts; analyzing the printing request received at the printing-request receiving and determining whether the partial data necessary for constructing the printing data are stored in the data storage device, and storing the partial data acquired in the partial-data acquiring in the data storage device, in the partial-data acquiring, the missing partial data for constructing the printing data are acquired from another printer on the basis of the determination result at the data-storage determining, and in the printing-data constructing, the printing data being constructed on the basis of the partial data acquired in the partial-data acquiring and the partial data in the data storage device.

According to this construction, when the program is read out by the computer and the process is performed by the computer in accordance with the read-out program, the same operation and advantages as the printer according to Exemplary Aspect 17 can be obtained.

(Exemplary Aspect 33) A print processing program according to Exemplary Aspect 33 is the print processing program according to Exemplary Aspect 32, in the partial-data acquiring, the plurality of printers being used as data acquisition sources, respectively, hop-count information corresponding to each data acquisition source is read out from hop-count information storage device to store the hop-count information, which indicates a hop count as the number of connection stages of repeaters in a communication path with each data acquisition source, corresponding to the corresponding data acquisition source, a data acquisition source of which the hop count is smallest among the data acquisition sources is selected on the basis of the read-out hop-count information, and the acquisition request is transmitted to the selected data acquisition source, thereby acquiring the partial data.

According to this construction, when the program is read out by the computer and the process is performed by the computer in accordance with the read-out program, the same operation and advantages as the printer according to Exemplary Aspect 18 can be obtained.

(Exemplary Aspect 34) A print processing program according to Exemplary Aspect 34 is the print processing program according to Exemplary Aspect 33, the hop-count information storage device storing the hop-count information indicating the number of connection stages of repeaters in a communication path to each data acquisition source and communication-path information specifying the communication path, corresponding to the corresponding data acquisition source, and in the partial-data acquiring, the acquisition request being transmitted to the selected data acquisition source and the partial data are acquired through the communication path specified on the basis of the communication-path information corresponding to the data acquisition source.

According to this construction, when the program is read out by the computer and the process is performed by the computer in accordance with the read-out program, the same operation and advantages as the printer according to Exemplary Aspect 19 can be obtained.

(Exemplary Aspect 35) A print process program according to Exemplary Aspect 35 is the print process program according to Exemplary Aspect 32, in the partial-data acquiring, the plurality of printers being used as data acquisition sources, respectively, and arrival-time information is read out from arrival-time information storage device to store the arrival-time information which indicates an arrival time of a packet at each data acquisition source corresponding to the corresponding data acquisition source, a data acquisition source of which the arrival time is shortest, among the plurality of data acquisition sources is selected on the basis of the read-out arrival-time information, and the acquisition request is transmitted to the selected data acquisition source, thereby acquiring the partial data.

According to this construction, when the program is read out by the computer and the process is performed by the computer in accordance with the read-out program, the same operation and advantages as the printer according to Exemplary Aspect 20 can be obtained.

(Exemplary Aspect 36) A print processing program according to Exemplary Aspect 36 is the print processing program according to Exemplary Aspect 35, the arrival-time information storage device storing the arrival-time information indicating the arrival time of a packet at each data acquisition source and communication-path information specifying the communication path to each data acquisition source corresponding to the corresponding data acquisition source, and in the partial-data acquiring, the acquisition request being transmitted to the selected data acquisition source and the partial data are acquired through the communication path specified on the basis of the communication-path information corresponding to the selected data acquisition source.

According to this construction, when the program is read out by the computer and the process is performed by the computer in accordance with the read-out program, the same operation and advantages as the printer according to Exemplary Aspect 21 can be obtained.

(Exemplary Aspect 37) A print processing program according to Exemplary Aspect 37 is the print processing program according to any one of Exemplary Aspects 32 to 36, which allows a computer to perform a process, the process further including: managing the partial data stored in the data storage device and managing the partial data, at the stored-data registering, the respective partial data constituting the printing data are stored in the data storage device corresponding to identification information identifying the respective partial data, at the second data managing, the identification information identifying the partial data necessary for constructing the printing data being acquired and a data-existence confirmation request including the acquired identification information is broadcasted, and when a data-existence response indicating that the partial data exist is received, the address information of the transmission source of the data-existence response being registered in the address-information storage device, at the first data managing, when the data-existence confirmation request is received, the same identification information as the identification information included in the received data-existence confirmation request being retrieved from the data storage device, and when the identification information is detected, the data-existence response is transmitted to the printer as the transmission source, and in the partial-data acquiring, the address information corresponding to an acquisition source of the partial data being read out from the address-information storage device, and the acquisition request is transmitted to the data acquisition source on the basis of the read-out address information, thereby acquiring the partial data.

According to this construction, when the program is read out by the computer and the process is performed by the computer in accordance with the read-out program, the same operation and advantages as the printer according to Exemplary Aspect 22 can be obtained.

Here, at the second data managing, the identification information identifying the partial data necessary for constructing the printing data is acquired. More specifically, since the identification information is included in the printing request, the identification information can be acquired from the printing request received at the printing-request receiving. In addition, the identification information can be acquired by generating the identification independently.

(Exemplary Aspect 38) A print processing program according to Exemplary Aspect 38 is the print processing program according to any one of Exemplary Aspects 32 to 36, which allows a computer to perform a process, the process including: managing the partial data stored in the data storage device; and managing the partial data, at the stored-data registering, the respective partial data constituting the printing data being stored in the data storage device corresponding to identification information identifying the respective partial data, at the first data managing, the identification information corresponding to the respective partial data in the data storage device being read out from the data storage device and a data-existence notification including the read-out identification information is broadcasted, at the second data managing, when the data-existence notification is received, the address information of the transmission source of the data-existence notification being registered in the address-information storage device corresponding to the identification information included in the received data-existence notification, and in the partial-data acquiring, the identification information identifying the respective partial data necessary for constructing the printing data being acquired, the address information corresponding to the acquired identification information is read out from the address-information storage device, and the acquisition request is transmitted to an acquisition source of the partial data on the basis of the read-out address information, thereby acquiring the partial data.

According to this construction, when the program is read out by the computer and the process is performed by the computer in accordance with the read-out program, the same operation and advantages as the printer according to Exemplary Aspect 23 can be obtained.

Here, in the partial-data acquiring, the identification information identifying the partial data necessary for constructing the printing data is acquired. More specifically, since the identification information is included in the printing request, the identification information can be acquired from the printing request received at the printing-request receiving. In addition, the identification information can be acquired by generating the identification independently. The same is true of a print processing program according to Exemplary Aspect 39 or 41 and a network printing method according to any one of Exemplary Aspects 53, 54, and 56.

(Exemplary Aspect 39) A print processing program according to Exemplary Aspect 39 is the print processing program according to any one of Exemplary Aspects 32 to 36, which allows a computer to perform a process, the process including: managing the partial data stored in the data storage device, at the first data managing, the plurality of printers being used as data acquisition sources, respectively, the address information of the data acquisition source storing the partial data being registered in the address-information storage device corresponding to identification information identifying the partial data, and when a data-existence confirmation request including the identification information is received, the address information corresponding to the identification information included in the received data-existence confirmation request being read out from the address-information storage device and a data-existence response including the read-out address information is transmitted to the printer as a request source, and in the partial-data acquiring, the identification information identifying the corresponding partial data necessary for constructing the printing data being acquired, a data-existence confirmation request including the acquired identification information transmitted to the data acquisition source, and when the data-existence response is received, the acquisition request being transmitted to the data acquisition source on the basis of the address information included in the received data-existence response, thereby acquiring the partial data.

According to this construction, when the program is read out by the computer and the process is performed by the computer in accordance with the read-out program, the same operation and advantages as the printer according to Exemplary Aspect 24 can be obtained.

(Exemplary Aspect 40) A print processing program according to Exemplary Aspect 40 is the print processing program according to Exemplary Aspect 39, at the first data managing, the identification information identifying the partial data stored in the data storage device being acquired, and the address information of the corresponding printer is registered in the address-information storage device corresponding to the acquired identification information.

According to this construction, when the program is read out by the computer and the process is performed by the computer in accordance with the read-out program, the same operation and advantages as the printer according to Exemplary Aspect 25 can be obtained.

Here, at the first data managing, the identification information identifying the partial data stored in the data storage device is acquired. More specifically, since the identification information is included in the printing request, the identification information can be acquired from the printing request transmitted at the printing-request transmitting. In a case where the identification information included in the printing request is stored in the data storage device together with the partial data thereof, the identification information can be acquired from the data storage device. In addition, the identification information can be acquired by generating the identification independently. The same is true of a print processing program according to Exemplary Aspect 42 and a network printing method according to Exemplary Aspect 55 or 57.

(Exemplary Aspect 41) A print processing program according to Exemplary Aspect 41 is the print processing program according to any one of Exemplary Aspects 32 to 36, in the partial-data acquiring, the identification information identifying the corresponding partial data necessary for constructing the printing data being acquired and a data-existence confirmation request including the acquired identification information is transmitted to the data managing terminal, and when the data-existence response is received, the acquisition request being transmitted to the data acquisition source on the basis of the address information included in the received data-existence response, thereby acquiring the partial data.

According to this construction, when the program is read out by the computer and the process is performed by the computer in accordance with the read-out program, the same operation and advantages as the printer according to Exemplary Aspect 26 can be obtained.

(Exemplary Aspect 42) A print processing program according to Exemplary Aspect 42 is the print processing program according to Exemplary Aspect 41, which allows a computer to perform a process, the process including managing the partial data stored in the data storage device, at the first data managing, identification information identifying the respective partial data stored in the data storage device being acquired and a data-existence notification including the acquired identification information being transmitted to the data managing terminal.

According to this construction, when the program is read out by the computer and the process is performed by the computer in accordance with the read-out program, the same operation and advantages as the printer according to Exemplary Aspect 27 can be obtained.

(Exemplary Aspect 43) A print processing program according to Exemplary Aspect 43 is a print processing program which allows a computer to perform a process, the process including: retrieving partial data from data storage device to store all or a part of printing data, which are divided to correspond to respective constituent parts constituting printing contents, in units of divided data, in response to an acquisition request from another printer; transmitting the partial data detected in the stored-data retrieving to the other data processor as a request source; acquiring the partial data necessary for constructing the printing data from the other printer; constructing the printing data on the basis of the partial data acquired in the partial-data acquiring; and performing the printing on the basis of the printing data constructed in the printing-data constructing, in the partial-data acquiring, the plurality of printers being used as data acquisition sources, respectively, communication-cost information corresponding to each data acquisition source is read out from communication-cost information storage device to store the communication-cost information indicating communication cost necessary for communication with the corresponding data acquisition source corresponding to the corresponding data acquisition source, a data acquisition source whose communication cost is smallest among the plurality of data acquisition sources being selected on the basis of the read-out communication-cost information, and the acquisition request being transmitted to the selected data acquisition source, thereby acquiring the partial data.

According to this construction, when the program is read out by the computer and the process is performed by the computer in accordance with the read-out program, the same operation and advantages as the printer according to Exemplary Aspect 28 can be obtained.

(Exemplary Aspect 44) A print processing program according to Exemplary Aspect 44 is the print processing program according to Exemplary Aspect 43, the communication-cost information storage device storing the communication-cost information indicating the communication cost required for communication with the corresponding data acquisition source and communication-path information specifying the communication path to the corresponding data acquisition source corresponding to the corresponding data acquisition source, and in the partial-data acquiring, the acquisition request being transmitted to the selected data acquisition source and the partial data are acquired through the communication path specified on the basis of the communication-path information corresponding to the selected data acquisition source.

According to this construction, when the program is read out by the computer and the process is performed by the computer in accordance with the read-out program, the same operation and advantages as the printer according to Exemplary Aspect 29 can be obtained.

(Exemplary Aspect 45) On the other hand, in order to accomplish the above object, a network data processing method according to Exemplary Aspect 45 is a network data processing method in which a plurality of data processors are connected to a network and a data processing is performed by using communications between the data processors, the network data processing method including: for a first data processor, acquiring partial data necessary for constructing process data, which are divided to correspond to respective constituent parts constituting process contents, from a data processor for which time required for data transmission is shortest or for which the time required for data transmission is estimated to be shortest, among the plurality of data processors; for a second data processor, retrieving the partial data from data storage device in response to an acquisition request from the first data processor; and transmitting the partial data detected in the stored-data retrieving to the first data processor, and for the first data processor, constructing the process data on the basis of the partial data acquired in the partial-data acquiring.

As a result, the same advantages as the network data processing system according to Exemplary Aspect 1 can be obtained.

(Exemplary Aspect 46) On the other hand, in order to accomplish the above object, a network printing method according to Exemplary Aspect 46 is a network printing method in which a plurality of printers and a printing request unit for requesting printing to at least one printer of the plurality of printers are connected to a network and a printing process is performed through communications between the printers, the network printing method including: for a first printer, acquiring partial data necessary for constructing printing data, which are divided to correspond to respective constituent parts constituting printing contents, from a printer for which time required for data transmission is shortest or for which the time required for data transmission is estimated to be shortest, among the plurality of printers. For a second printer, retrieving the partial data from data storage device in response to an acquisition request from the first printer; and transmitting the partial data detected in the stored-data retrieving to the first printer, and for the first printer, constructing the printing data on the basis of the partial data acquired in the partial-data acquiring; and performing the printing on the basis of the printing data constructed in the printing-data constructing.

As a result, the same advantages as the network printer according to Exemplary Aspect 16 can be obtained.

(Exemplary Aspect 47) A network printing method according to Exemplary Aspect 47 is the network printing method according to Exemplary Aspect 46, the method including: for the printing-request unit, generating the printing data; and transmitting a printing request, which includes structure information indicating the divided structure of the printing data generated at the printing-data generating and identification information identifying the partial data corresponding to the respective constituent parts, to the first printer. For the first printer, receiving the printing request; analyzing the printing request received at the printing-request receiving and determining whether the partial data necessary for constructing the printing data are stored in the data storage device, and storing the partial data acquired in the partial-data acquiring in the data storage device, in the partial-data acquiring, the missing partial data for constructing the printing data being acquired from another printer on the basis of the determination result at the data-storage determining, and in the printing-data constructing, the printing data are constructed on the basis of the partial data acquired in the partial-data acquiring and the partial data in the data storage device.

As a result, the same advantages as the printer according to Exemplary Aspect 17 can be obtained.

(Exemplary Aspect 48) A network printing method according to Exemplary Aspect 48 is the network printing method according to Exemplary Aspect 47, in the partial-data acquiring, the plurality of printers being used as data acquisition sources, respectively, hop-count information corresponding to each data acquisition source is read out from hop-count information storage device to store the hop-count information, which indicates a hop count as the number of connection stages of repeaters in a communication path with the corresponding data acquisition source, corresponding to the corresponding data acquisition source, a data acquisition source of which the hop count is smallest among the data acquisition sources is selected on the basis of the read-out hop-count information, and the acquisition request is transmitted to the selected data acquisition source, thereby acquiring the partial data.

Accordingly, the same advantages as the network printing system according to Exemplary Aspect 3 can be obtained.

(Exemplary Aspect 49) A network printing method according to Exemplary Aspect 49 is the network printing method according to Exemplary Aspect 48, the hop-count information storage device storing the hop-count information indicating the number of connection stages of repeaters in a communication path to each data acquisition source and communication-path information specifying the communication path, corresponding to the corresponding data acquisition source, and in the partial-data acquiring, the acquisition request being transmitted to the selected data acquisition source and the partial data are acquired through the communication path specified on the basis of the communication-path information corresponding to the data acquisition source.

As a result, the same advantages as the network printing system according to Exemplary Aspect 4 can be obtained.

(Exemplary Aspect 50) A network printing method according to Exemplary Aspect 50 is the network printing method according to Exemplary Aspect 47, in the partial-data acquiring, the plurality of printers are used as data acquisition sources, respectively, and arrival-time information is read out from arrival-time information storage device to store the arrival-time information which indicates an arrival time of a packet at each data acquisition source corresponding to the corresponding data acquisition source, a data acquisition source of which the arrival time is shortest, among the plurality of data acquisition sources is selected on the basis of the read-out arrival-time information, and the acquisition request is transmitted to the selected data acquisition source, thereby acquiring the partial data.

As a result, the same advantages as the network printing system according to Exemplary Aspect 5 can be obtained.

(Exemplary Aspect 51) A network printing method according to Exemplary Aspect 51 is the network printing method according to Exemplary Aspect 50, the arrival-time information storage device storing the arrival-time information indicating the arrival time of a packet at each data acquisition source and communication-path information specifying a communication path to the corresponding data acquisition source corresponding to the corresponding data acquisition source, and in the partial-data acquiring, the acquisition request being transmitted to the selected data acquisition source and the partial data are acquired through the communication path specified on the basis of the communication-path information corresponding to the selected data acquisition source.

As a result, the same advantages as the network printing system according to Exemplary Aspect 6 can be obtained.

(Exemplary Aspect 52) A network printing method according to Exemplary Aspect 52 is the network printing method according to any one of Exemplary Aspects 47 to 51, the respective partial data constituting the printing data being stored in the data storage device corresponding to the identification information identifying the respective partial data. For the first printer, the identification information identifying the respective partial data necessary for constructing the printing data is acquired and a data-existence confirmation request including the acquired identification information is broadcasted. For the second printer, when the data-existence confirmation request is received, the same identification information as the identification information included in the received data-existence confirmation request is retrieved from the data storage device and when the identification information is detected, a data-existence response indicating that the partial data exist is transmitted to the printer as the request source. For the first printer, when the data-existence response is received, the address information of the transmission source of the data-existence response is registered in the address-information storage device, in the partial-data acquiring, the address information corresponding to the acquisition source of the partial data is read out from the address-information storage device and the acquisition request is transmitted to the data acquisition source on the basis of the read-out address information, thereby acquiring the partial data.

As a result, the same advantages as the network printing system according to Exemplary Aspect 7 can be obtained.

Here, in the first printer, the identification information identifying the partial data necessary for constructing the printing data is acquired. More specifically, since the identification information is included in the printing request, the identification information can be acquired from the printing request received at the printing-request receiving. In addition, the identification information can be acquired by generating the identification independently.

(Exemplary Aspect 53) A network printing method according to Exemplary Aspect 53 is the network printing method according to any one of Exemplary Aspects 47 to 51, the respective partial data constituting the printing data are stored in the data storage device corresponding to identification information identifying the corresponding partial data. For the second printer, the first data managing of reading out the identification information corresponding to the corresponding partial data in the data storage device from the data storage device and broadcasting a data-existence notification including the read-out identification information is performed. For the first printer, when the data-existence notification is received, the second data managing of registering the address information of the transmission source of the data-existence notification in the address-information storage device corresponding to the identification information included in the received data-existence notification is performed, and wherein in the partial-data acquiring, the identification information identifying the respective partial data necessary for constructing the printing data is acquired, the address information corresponding to the acquired identification information is read out from the address-information storage device, and the acquisition request is transmitted to an acquisition source of the partial data on the basis of the read-out address information, thereby acquiring the partial data.

As a result, the same advantages as the network printing system according to Exemplary Aspect 8 can be obtained.

(Exemplary Aspect 54) A network printing method according to Exemplary Aspect 54 is the network printing method according to any one of Exemplary Aspects 47 to 51, for the second printer, the plurality of printers being used as data acquisition sources, respectively, and a first data managing of registering the address information of the data acquisition source storing the partial data in the address-information storage device corresponding to identification information identifying the partial data and when a data-existence confirmation request including the identification information is received, reading out the address information corresponding to the identification information included in the received data-existence confirmation request from the address-information storage device and transmitting a data-existence response including the read-out address information to the printer as a request source is performed. In the partial-data acquiring, the identification information identifying the respective partial data necessary for constructing the printing data is acquired and a data-existence confirmation request including the acquired identification information is transmitted to the data acquisition source, and when the data-existence response is received, the acquisition request is transmitted to the data acquisition source on the basis of the address information included in the received data-existence response, thereby acquiring the partial data.

As a result, the same advantages as the network printing system according to Exemplary Aspect 9 can be obtained.

(Exemplary Aspect 55) A network printing method according to Exemplary Aspect 55 is the network printing method according to Aspect 54, at the first data managing, the identification information identifying the partial data stored in the data storage device is acquired and the address information of the corresponding printer is registered in the address-information storage device corresponding to the acquired identification information.

As a result, the same advantages as the network printing system according to Exemplary Aspect 10 can be obtained.

(Exemplary Aspect 56) A network printing method according to Exemplary Aspect 56 is the network printing method according to any one of Exemplary Aspects 47 to 51, the plurality of printers are used as data acquisition sources, respectively, and a data managing terminal for managing the stored data of the data acquisition sources is connected to the network. For the data managing terminal, a data managing of registering the address information of the data acquisition source storing the partial data in the address-information storage device corresponds to identification information identifying the respective partial data. When a data-existence confirmation request including the identification information is received, reading out the address information corresponding to the identification information included in the received data-existence confirmation request from the address-information storage device and transmitting a data-existence response including the read-out address information to the printer as the request source is performed. In the partial-data acquiring, the identification information identifying the respective partial data necessary for constructing the printing data being acquired and a data-existence confirmation request including the acquired identification information, being transmitted to the data managing terminal, and when the data-existence response is received, the acquisition request being transmitted to the data acquisition source on the basis of the address information included in the received data-existence response, thereby acquiring the partial data.

As a result, the same advantages as the network printing system according to Exemplary Aspect 11 can be obtained.

(Exemplary Aspect 57) A network printing method according to Exemplary Aspect 57 is the network printing method according to Exemplary Aspect 56, for the second printer, acquiring identification information identifying the respective partial data stored in the data storage device and transmitting a data-existence notification including the acquired identification information to the data managing terminal is performed, and at the data managing, when the data-existence notification is received, the address information of the transmission source of the data-existence notification is registered in the address-information storage device corresponding to the identification information included in the received data-existence notification.

As a result, the same advantages as the network printing system according to Exemplary Aspect 12 can be obtained.

(Exemplary Aspect 58) A network printing method according to Exemplary Aspect 58 is a network printing method in which a plurality of printers and a printing request unit for requesting printing to at least one printer of the plurality of printers are connected to a network and a printing process is performed through communications between the printers, the network printing method including: for a first printer, acquiring partial data necessary for constructing printing data, which are divided to correspond to respective constituent parts constituting printing contents, from a printer for which time required for data transmission is shortest or for which the time required for data transmission is estimated to be shortest, among the plurality of printers. For a second printer, retrieving the partial data from data storage device in response to an acquisition request from the first printer; and transmitting the partial data detected in the stored-data retrieving to the first printer; and for the first printer, constructing the printing data on the basis of the partial data acquired in the partial-data acquiring; and performing the printing on the basis of the printing data constructed in the printing-data constructing in the partial-data acquiring, the plurality of printers being used as data acquisition sources, respectively, communication-cost information corresponding to each data acquisition source is read out from communication-cost information storage device to store the communication-cost information indicating communication cost necessary for communication with each data acquisition source corresponding to the corresponding data acquisition source. A data acquisition source whose communication cost is smallest among the plurality of data acquisition sources being selected on the basis of the read-out communication-cost information, and the acquisition request being transmitted to the selected data acquisition source, thereby acquiring the partial data.

As a result, the same advantages as the printer according to Exemplary Aspect 28 can be obtained.

(Exemplary Aspect 59) A network printing method according to Exemplary Aspect 59 is the network printing method according to Exemplary Aspect 58, the communication-cost information storage device storing the communication-cost information indicating the communication cost required for communication with each data acquisition source and communication-path information specifying the communication path to each data acquisition source corresponding to the corresponding data acquisition source. In the partial-data acquiring, the acquisition request being transmitted to the selected data acquisition source and the partial data are acquired through the communication path specified on the basis of the communication-path information corresponding to the selected data acquisition source.

Accordingly, the same or similar advantages as the network printing system according to Exemplary Aspect 14 can be obtained.

DETAILED DESCRIPTION OF PREFERRED EMBODIMENTS

Hereinafter, a first exemplary embodiment of the present invention will be described with reference to the figures. FIGS. 1 to 17 are diagrams illustrating the first exemplary embodiment of a network data processing system, a network printing system, a data processor, a printer, a data processing program, a print processing program, a network data processing method, and a network printing method according to exemplary embodiment of the present invention.

Figure 1:
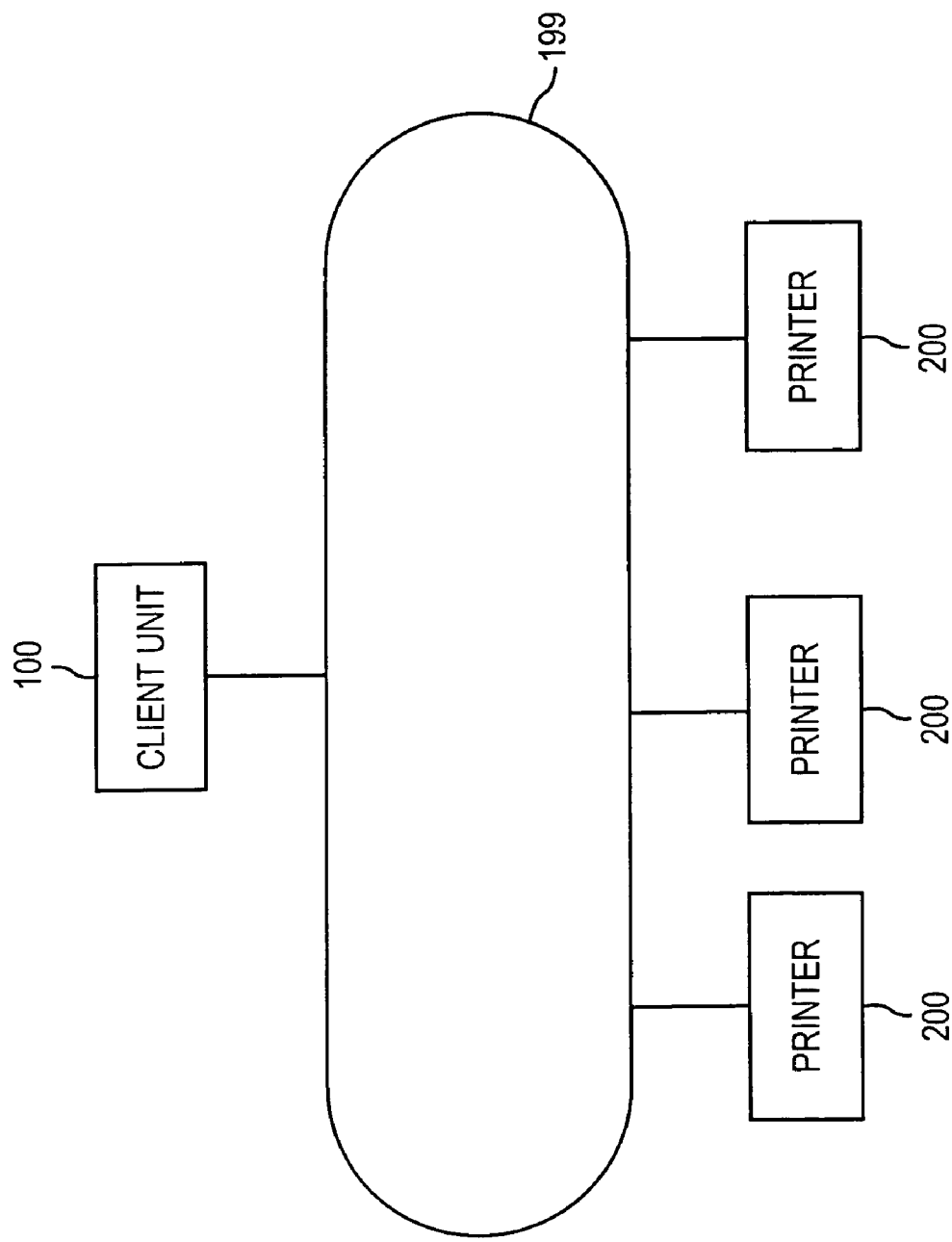
FIG. 1 is a block diagram illustrating a structure of a network system to which exemplary embodiments of the present invention are applied.

In this exemplary embodiment, as shown in FIG. 1, the network data processing system, the network printing system, the data processor, the printer, the data processing program, the print processing program, the network data processing method, and the network printing method according to the exemplary embodiments of the present invention are applied to a case where a printer 200 performs the printing in response to a printing request from a client unit 100.

First, a structure of a network system to which the present invention is applied will be described with reference to FIG. 1.

FIG. 1 is a schematic block diagram illustrating a structure of a network system to which the exemplary embodiments of the present invention is applied.

As shown in FIG. 1, a client unit 100 provided for a user's use and a plurality of printers 200 to perform the printing in response to a printing request from the client unit 100 are connected to Internet 199.

Next, a structure of the client unit 100 will be described in detail with reference to FIG. 2.

Figure 2:
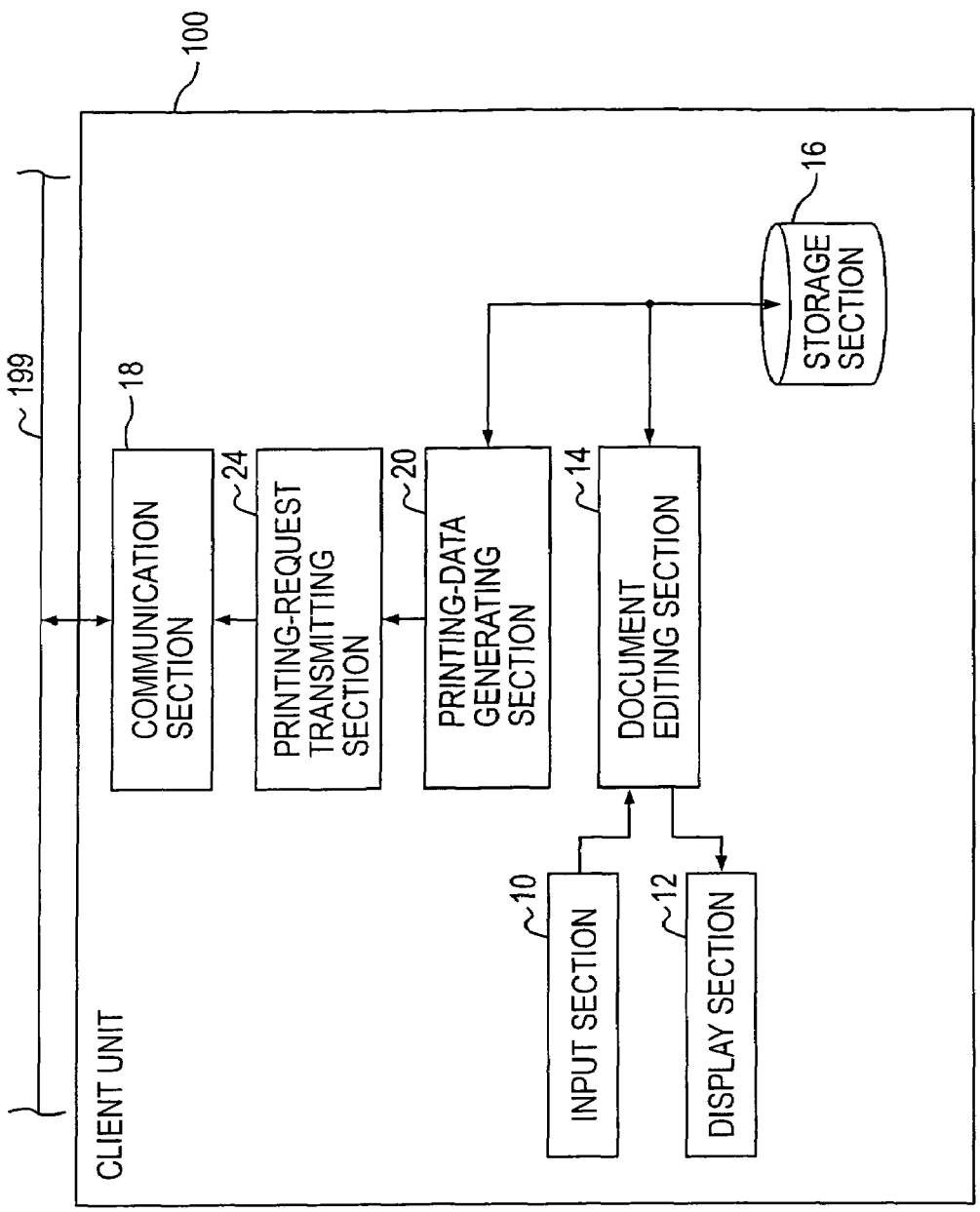
FIG. 2 is a functional block diagram illustrating a structure of a client unit 100.

FIG. 2 is a functional block diagram illustrating a structure of the client unit 100.

The client unit 100 includes, as shown in FIG. 2, an input section 10 including a keyboard, a mouse, etc., a display section 12 including CRT (Cathode Ray Tube) or LCD (Liquid Crystal Display) or the like, a document editing section 14 to prepare and combine documents, and a storage section 16 including a hard disk, etc. A user prepares and edits a document using the input section 10, the display section 12, and the document editing section 14. The document prepared and edited in the document editing section 14 is stored as document data in the storage section 16.

The client unit 100 further includes a communication section 18 as a communication interface connected to Internet 199 to perform communications, a printing-data generating section 20 to generate the printing data on the basis of the document data stored in the storage section 16, and a printing-request transmitting section 24 to transmit the printing request to the printer 200.

The printing-data generating section 20 generates the printing data, which is divided to correspond to respective constituent parts constituting printing contents, on the basis of the document data associated with the user's printing request among the document data stored in the storage section 16.

Figure 3:
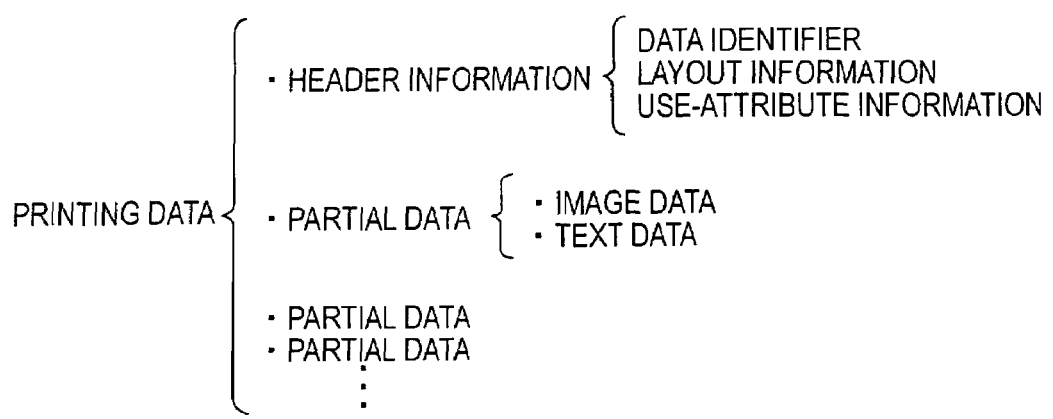
FIG. 3 is a schematic showing a hierarchical structure of printing data.

FIG. 3 is a schematic showing a hierarchical structure of the printing data.

Figure 4:
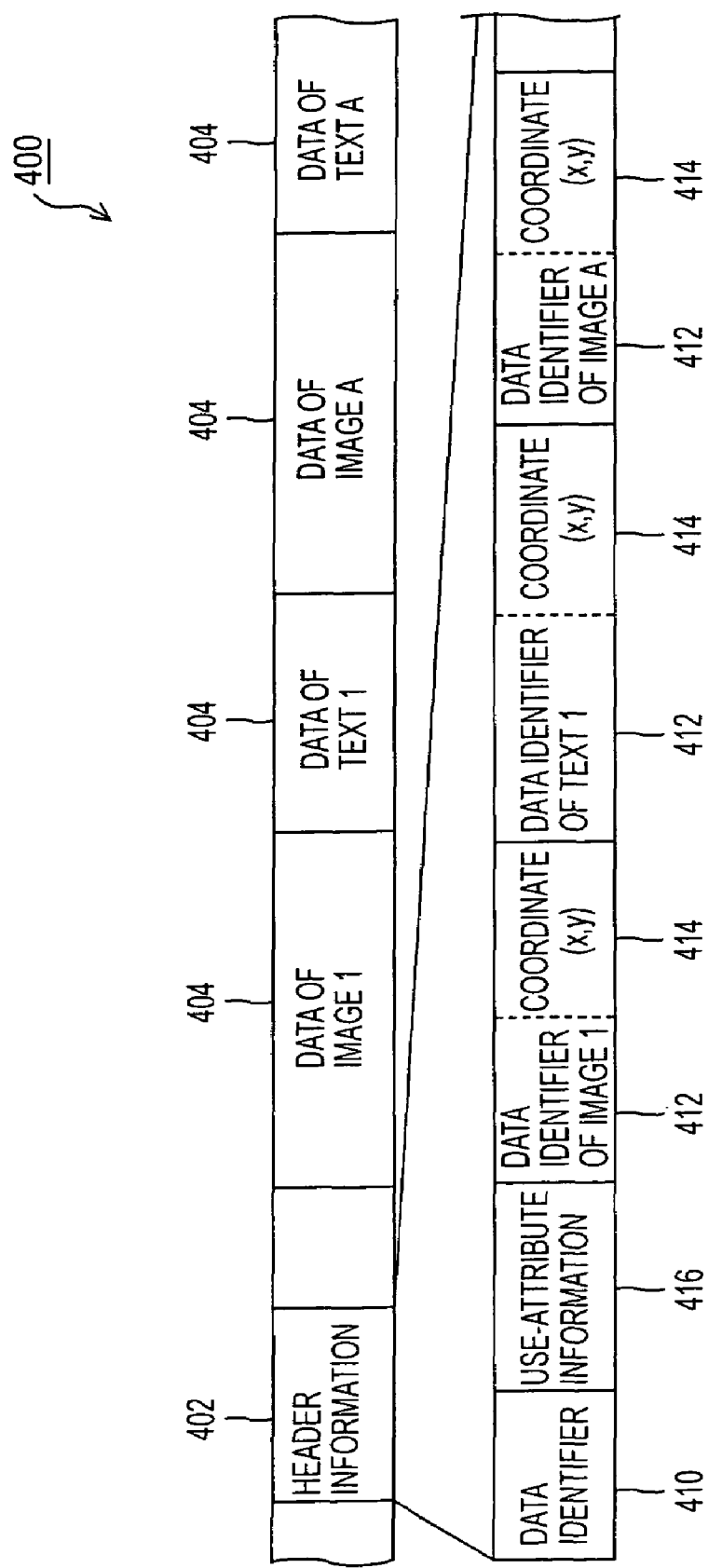
FIG. 4 is a schematic showing a data structure of the printing data.

FIG. 4 is a schematic showing a data structure of printing data.

The printing data 400 includes header information 402 and one or more pieces of partial data 404, as shown in FIGS. 3 and 4.

The partial data 404 are data corresponding to several constituent parts (images or texts) constituting the printing contents, and include image data or text data.

The header information 402 includes a data identifier 410 to identify the printing data 400, data identifiers 412 to identify the respective partial data pieces 404 in units of partial data piece 404, layout information 414 indicating a layout structure of the printing data 400, and use attribute information 416 indicating the use attribute. The use attribute information 416 indicates the number of times, the rate, the frequency, etc. of using data for the printing data 400 and each partial data piece 404.

Figure 5:
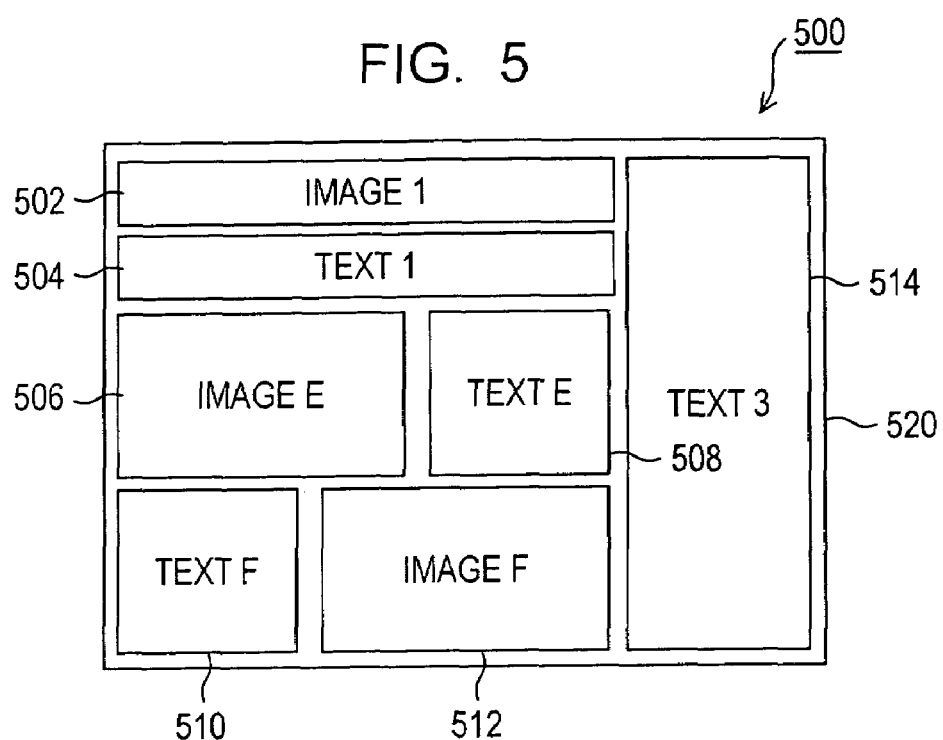
FIG. 5 is a schematic showing a data structure of document data 500.

FIG. 5 is a schematic showing a data structure of document data 500.

In the document data 500, as shown in FIG. 5, image data 502 indicating Image 1, text data 504 indicating Text 1, image data 506 indicating Image E, text data 508 indicating Text E, text data 510 indicating Text F, image data 512 indicating Image F, and text data 514 indicating Text 3 are arranged in a layout area 520. Here, Text 1 is disposed below Image 1, Image E and Text E are disposed below Text 1, Text F and Image F are disposed below Image E and Text E, and Text 3 is disposed on the right side of Image 1, Text 1, Text E, and Image F. The sizes and disposal positions of the constituent parts constitute the layout information of the document data 500.

When the printing data 400 are generated on the basis of the document data 500, the image data 502, 506, 512 and the text data 504, 508, 510, 514 become partial data pieces 404, respectively, and the data identifier 410 of the printing data 400 generated on the basis of the document data 500, the data identifiers 412 of the image data 502, 506, 512 and the text data 504, 508, 510, 514, and the layout information 414 of the document data 500 are included in the header information 402.

Figure 6:
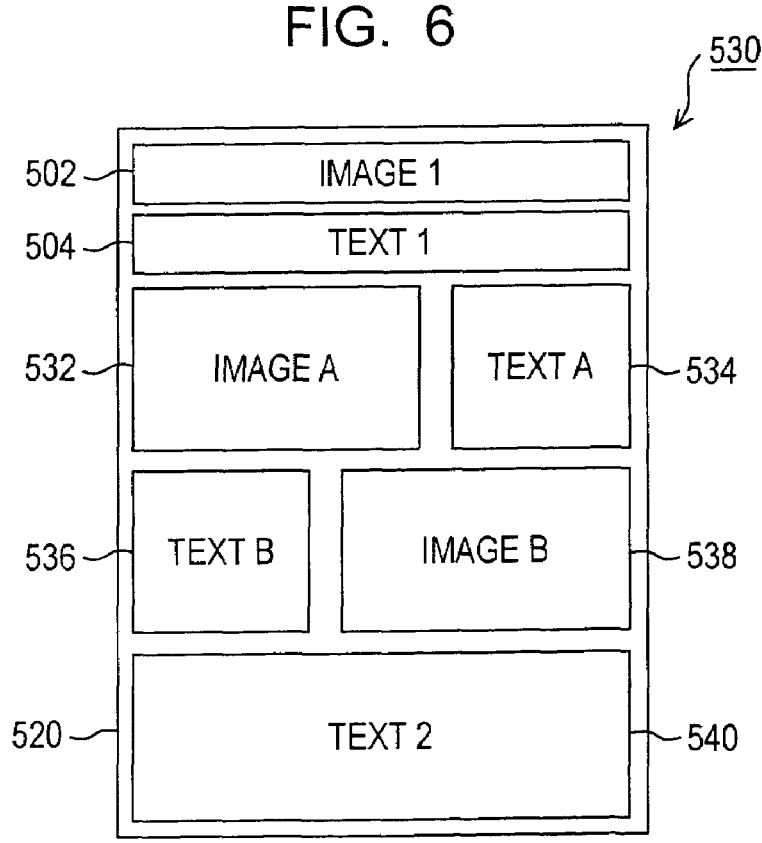
FIG. 6 is a schematic showing a data structure of document data 530.

FIG. 6 is a schematic showing a data structure of document data 530.

In the document data 530, as shown in FIG. 6, the image data 502, the text data 504, image data 532 indicating Image A, text data 534 indicating Text A, text data 536 indicating Text B, image data 538 indicating Image B, and text data 540 indicating Text 2 are arranged in the layout area 520. Here, Text 1 is disposed below Image 1, Image A and Text A are disposed below Text 1, Text B and Image B are disposed below Image A and Text A, and Text 2 is disposed below Text B and Image B. The sizes and disposal positions of the constituent parts constitute the layout information of the document data 530.

When the printing data 400 are generated on the basis of the document data 530, the image data 502, 532, 538 and the text data 504, 534, 536, 540 become partial data pieces 404, respectively, and the data identifier 410 of the printing data 400 generated on the basis of the document data 530, the data identifiers 412 of the image data 502, 532, 538 and the text data 504, 534, 536, 540, and the layout information 414 of the document data 530 are included in the header information 402.

When comparing FIG. 6 and FIG. 5, as the partial data pieces 404, the image data 502 and the text data 504 are repeated. In this exemplary embodiment, when printing the document data 530 of FIG. 6 after printing the document data 500 of FIG. 5, the printer 200 stores the printing data 400 generated on the basis of the document data 500 in units of partial data piece during printing thereof, utilizes the data stored in the storage section as the image data 502 and the text data 504, and acquires the image data 532, 538 and the text data 534, 536, 540 from other printers.

Figure 7:
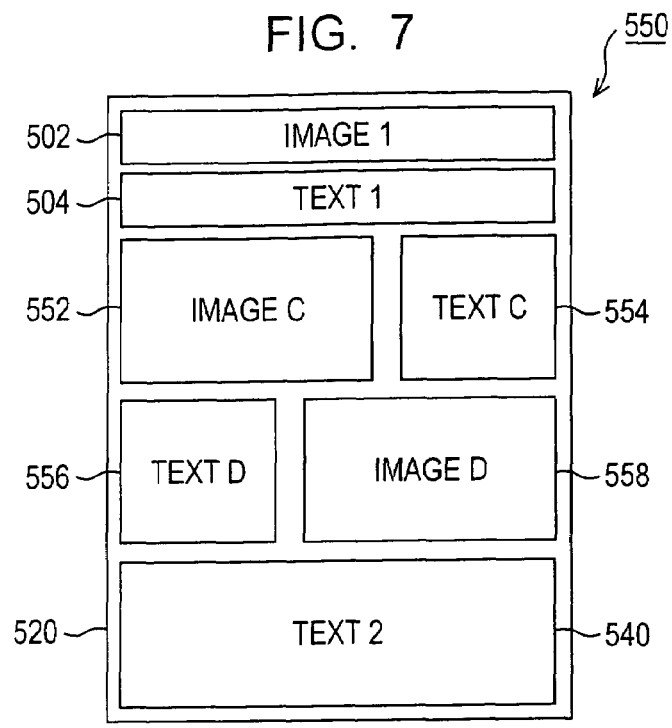
FIG. 7 is a schematic showing a data structure of document data 550.

FIG. 7 is a schematic showing a data structure of document data 550.

In the document data 550, as shown in FIG. 7, the image data 502, the text data 504, image data 552 indicating Image C, text data 554 indicating Text C, text data 556 indicating Text D, image data 558 indicating Image D, and the text data 540 are arranged in the layout area 520. Here, Text 1 is disposed below Image 1, Image C and Text C are disposed below Text 1, Text D and Image D are disposed below Image C and Text C, and Text 2 is disposed below Text D and Image D, respectively. The sizes and disposal positions of the constituent parts constitute the layout information of the document data 550.

When the printing data 400 are generated on the basis of the document data 550, the image data 502, 552, 558 and the text data 504, 554, 556, 540 become partial data pieces 404, respectively, and the data identifier 410 of the printing data 400 generated on the basis of the document data 550, the respective data identifiers 412 of the image data 502, 552, 558 and the text data 504, 554, 556, 540, and the layout information 414 of the document data 550 are included in the header information 402.

When comparing FIG. 7 and FIG. 5, as the partial data pieces 404, the image data 502 and the text data 504 are repeated. In this exemplary embodiment, when printing the document data 550 of FIG. 7 after printing the document data 500 of FIG. 5, the printer 200 stores the printing data 400 generated on the basis of the document data 500 in units of partial data piece during printing thereof, utilizes the data stored in the storage section for the image data 502 and the text data 504, and acquires the image data 552, 558 and the text data 554, 556, 540 from other printers 200.

When comparing FIG. 7 and FIG. 6, as the partial data pieces 404, the text data 540 are repeated. In this exemplary embodiment, when printing the document data 550 of FIG. 7 after printing the document data 500 and 530 of FIGS. 5 and 6, the printer 200 stores the printing data 400 generated on the basis of the document data 500 and 530 in units of partial data piece during printing thereof, utilizes the data stored in the storage section as the image data 502 and the text data 504, 540, and acquires the image data 552, 558 and the text data 554, 556 from other printers 200.

Returning to FIG. 2, the printing-request transmitting section 24 acquires the header information 402 from the printing data 400 generated by the printing-data generating section 20, and transmits the printing request including the acquired header information 402 to the printer 200. On the other hand, when new partial data pieces (which means partial data pieces not having been transmitted to any printer 200. Hereinafter, the same is valid) 404 are included in the printing data 400, the printing-request transmitting section transmits the new partial data pieces 404 together with the printing request to the printer 200.

Next, a hardware structure and a software structure of the client unit 100 will be described.

Figure 8:
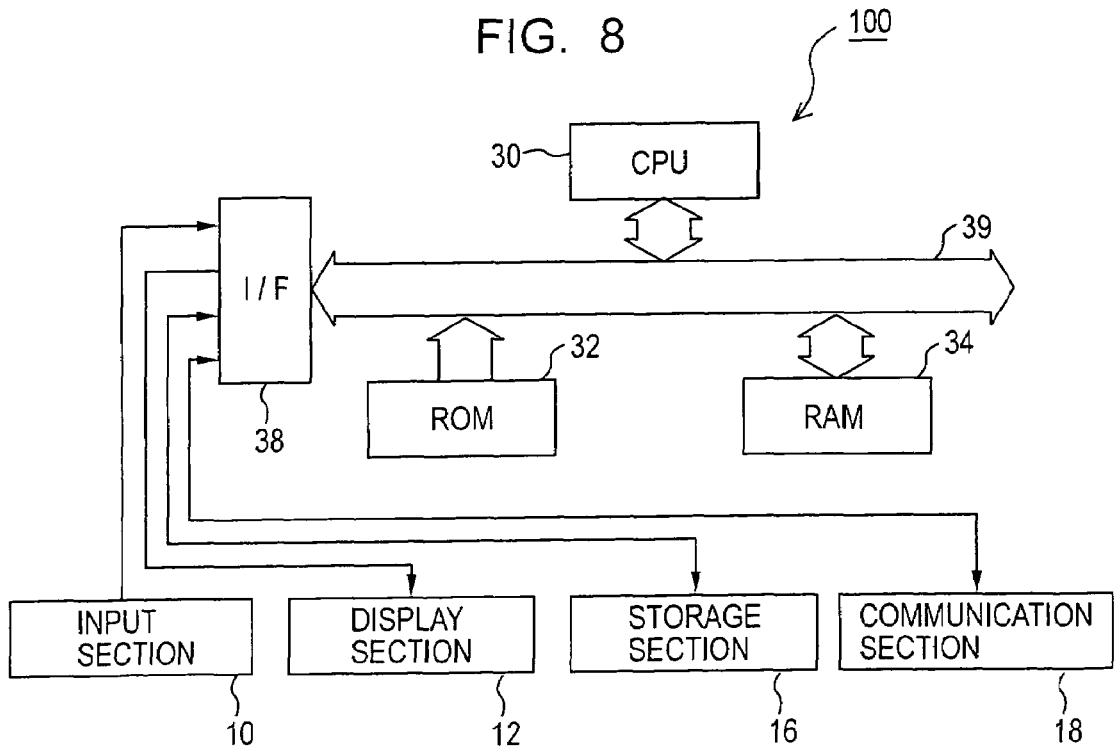
FIG. 8 is a schematic block diagram showing a hardware structure of the client unit 100.

FIG. 8 is a block schematic showing a hardware structure of the client unit 100.

The client unit 100 includes a general-use computer in which applications to prepare and edit documents are installed, and as shown in FIG. 8, includes a CPU 30 to control operation and the whole system on the basis of control programs, a ROM 32 to store the control programs, etc., a RAM 34 to store data read out from the ROM 32 or operation results required for operation by the CPU 30, and I/F 38 to interface input and output of data with external units, where the respective elements are connected to each other to transmit and receive data through a bus 39 which is a signal line to transmit data. An input section 10, a display section 12, a storage section 16, and a communication section 18 are connected as the external units to the I/F 38.

Figure 9:
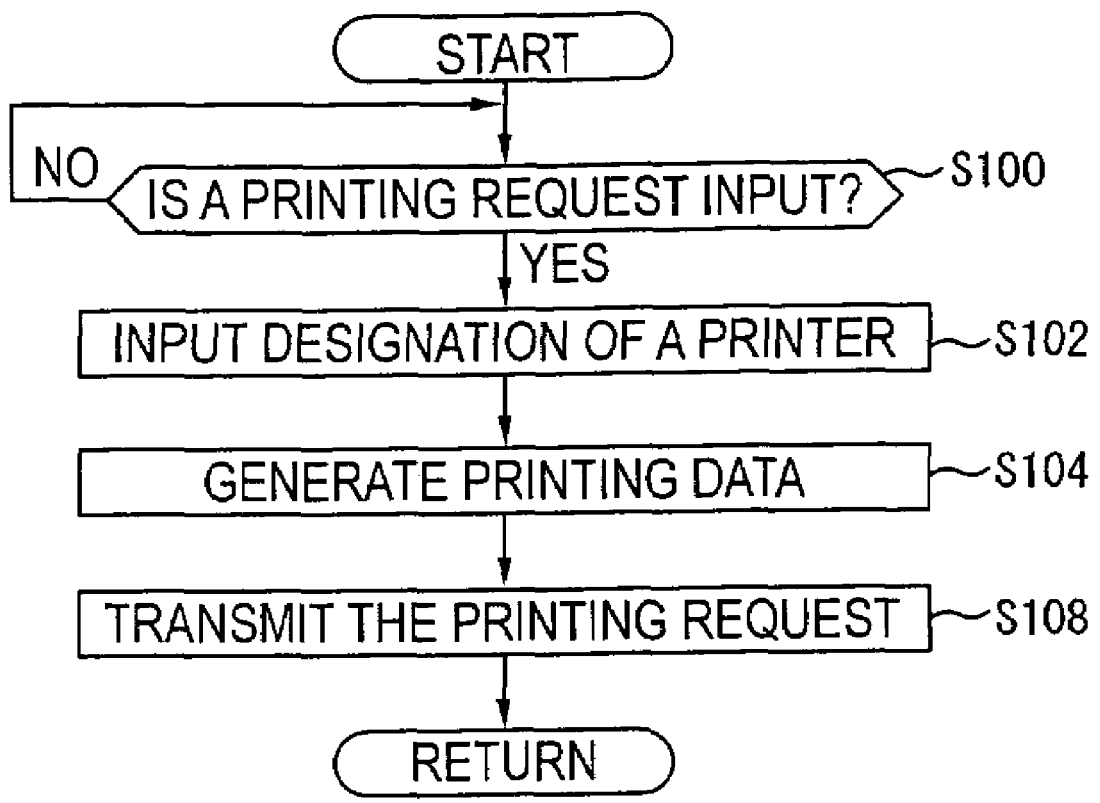
FIG. 9 is a flowchart illustrating a printing request process.

The CPU 30 includes a micro processing unit (MPU), etc., and starts predetermined programs stored in a predetermined area of the ROM 32, thereby performing printing request process shown in the flowchart of FIG. 9 in accordance with the programs.

FIG. 9 is a flowchart illustrating a printing request process.

The printing request process is a process of requesting printing to the printer 200 designated by a user, and when it is performed by the CPU 30, a step S100 is first performed as shown in FIG. 9.

At the step S100, it is determined whether printing instruction from the user is input through the input section 10. When it is determined that the printing instruction is input (Yes), a step S102 is performed. However, when it is determined that the printing instruction is not input (No), the step S100 is kept until the printing instruction is input.

At the step S102, the designation of the printer 200 is input through the input section 10, the printing data 400 are generated on the basis of the document data of which the printing is instructed by the user at a step S104, and then a step S108 is performed.

At the step S108, the header information 402 is acquired from the generated printing data 400, and the printing request including the acquired header information 402 is transmitted to the designated printer 200. When a new partial data piece 404 is included in the printing data 400, the partial data piece 404 is transmitted together with the printing request to the designated printer 200. The determination of the new partial data piece 404 can be performed by storing the transmission history of the partial data 404 to the printer 200 in the storage section 40 and by referring to the transmission history in the storage section 40.

When the process of the step S108 is completed, a series of processes are finished and the original process is restored.

Next, a structure of the printer 200 will be described in detail with reference to FIG. 10.

Figure 10:
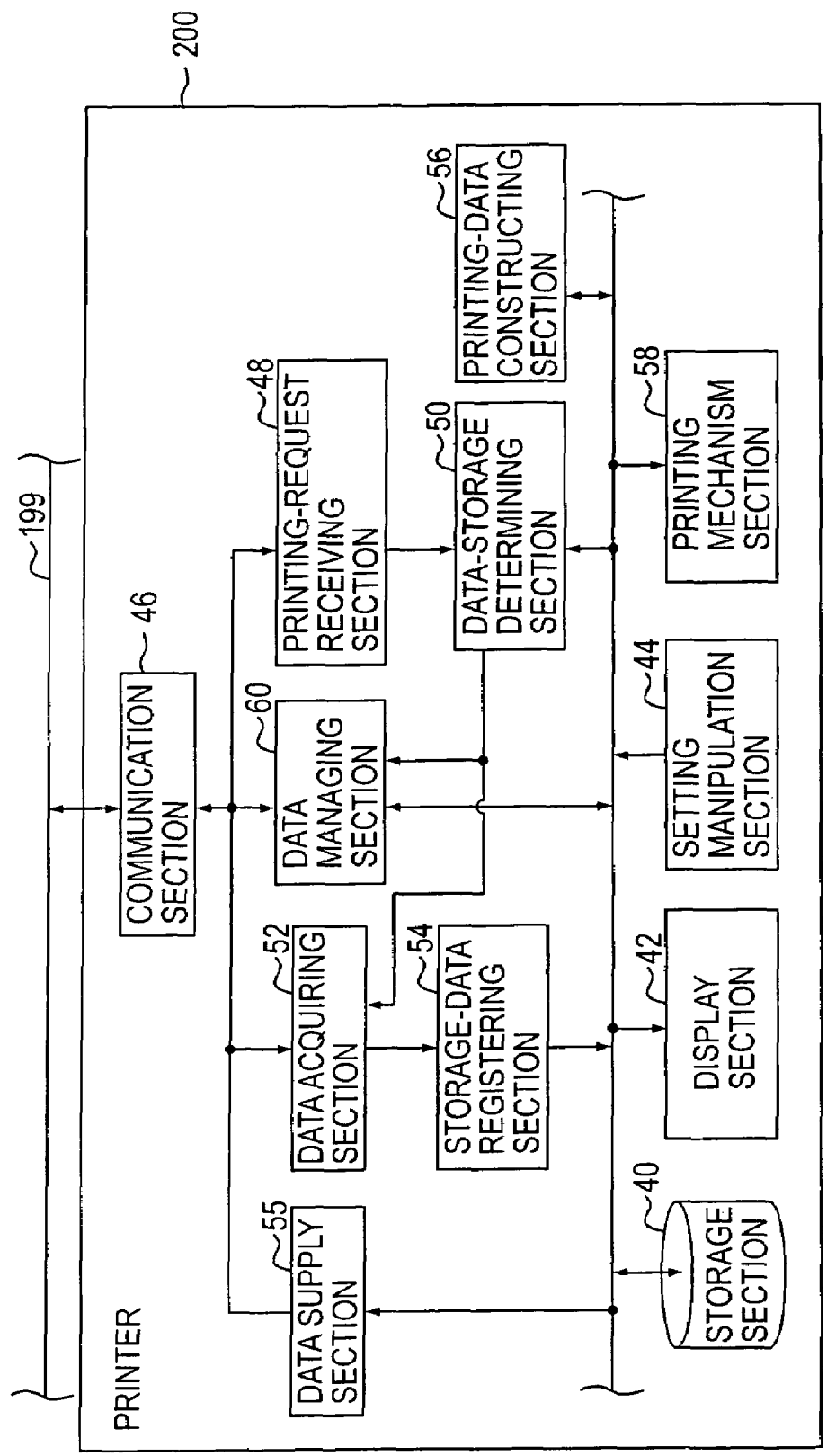
FIG. 10 is a functional block diagram illustrating a structure of a printer 200.

FIG. 10 is a functional block diagram illustrating a structure of the printer 200.

The printer 200 includes, as shown in FIG. 10, a storage section 40 including a hard disk, etc., a display section 42 including LCD, etc. to display error information, etc., a setting manipulation section 44 to perform manipulation such as compulsory discharge of paper, reset, etc., a communication section 46 as a communication interface connected to Internet 199 to perform communications, a printing-request receiving section 48 to receive a printing request, and a data-storage determining section 50 to analyze the printing request received by the printing-request receiving section 48 and determining whether partial data 404 (hereinafter, simply referred to as necessary partial data 404) necessary for constructing the printing data 400 are stored in the storage section 40.

When the partial data 404 are received together with the printing request, the printing-request receiving section 48 stores the received partial data 404 in the storage section 40 corresponding to a data identifier 412 thereof.

The storage section 40 uses a plurality of printers 200 as data acquisition sources, and registers hop-count information indicating the number of connection stages of routers on a communication path with a data acquisition source, corresponding to the data acquisition source every data acquisition source.

The data-storage determining section 50 searches the storage section 40 for the same data identifier 412 as the data identifier 412 included in the printing request received by the printing-request receiving section 48, determines that the partial data 404 corresponding to the data identifier 412 are stored in the storage section 40, when the corresponding data identifier 412 is detected, and determines that the partial data 404 corresponding to the data identifier 412 are not stored in the storage section 40, when the corresponding data identifier 412 is not detected.

The printer 200 further includes a data acquiring section 52 to acquire missing partial data 404 (hereinafter, referred to as missing partial data 404) to construct the printing data 400 from printer 200 on the basis of the determination result of the data-storage determining section 50, a storage-data registering section 54 to store the partial data 404 acquired by the data acquiring section 52 in the storage section 40, a data supply section 55 to supply the partial data 404 stored in the storage section 40 to printer 200, a printing-data constructing section 56 to construct the printing data 400 on the basis of the partial data 404 of the storage section 40, a printing mechanism section 58 to perform the printing on the basis of the printing data 400 constructed by the printing-data constructing section 56, and a data managing section 60 to manage the partial data 404 stored in the storage section 40.

The data supply section 55 searches the storage section 40 for the partial data 404 in response to the acquisition request from printer 200, and transmits the partial data 404 detected through the search to the other printer 200 as a request source.

When a data-existence confirmation request including the data identifier 412, the data managing section 60 searches the storage section 40 for the same data identifier 412 as the data identifier 412 included in the received data-existence confirmation request, and when the corresponding data identifier 412 is detected, the data managing section transmits a data-existence response indicating that the partial data 404 exist to the printer 200 as a request source.

The data managing section 60 acquires the data identifier 412 corresponding to the missing partial data 404 from the printing request on the basis of the determination result of the data-storage determining section 50, broadcasts the data-existence confirmation request including the acquired data identifier 412, and when the data-existence response is received, registers address information of the transmission source of the data-existence response in the storage section 40 corresponding to the data identifier 412. The address information of the transmission source can be acquired, for example, from the header information, etc. of the data-existence response packet.

When plural data acquisition sources corresponding to the same data identifier 412, exist for a missing partial data piece 404, the data acquiring section 52 reads out hop-count information corresponding to the data acquisition source from the storage section 40 every data acquisition source, and selects a data acquisition source of which the hop count is smallest among the plural data acquisition sources on the basis of the read-out hop-count information. Further, the data acquiring section reads out the address information corresponding to the selected data acquisition source (hereinafter, referred to as selected data acquisition source) from the storage section 40, and transmits an acquisition request to the selected data acquisition source on the basis of the read-out address information, thereby acquiring the partial data 404. Furthermore, when only one data acquisition source corresponding to the same data identifier 412 exists for the missing partial data 404, the data acquiring section 52 reads out the address information corresponding to the data acquisition source from the storage section 40, and transmits an acquisition request to the data acquisition source on the basis of the read-out address information, thereby acquiring the partial data 404.

The storage-data registering section 54 stores the partial data 404 acquired by the data acquiring section 52 in the storage section 40 corresponding to the data identifier 412. As the data identifier 412, the data identifier corresponding to the address information may be utilized, or the data identifier acquired again from the printing request may be utilized.

When the missing partial data 404 are acquired, the printing-data constructing section 56 constructs the printing data 400 on the basis of the header information 402 included in the printing request and the partial data 404 of the storage section 40.

Next, a hardware structure and a software structure of the printer 200 will be described.

Figure 11:
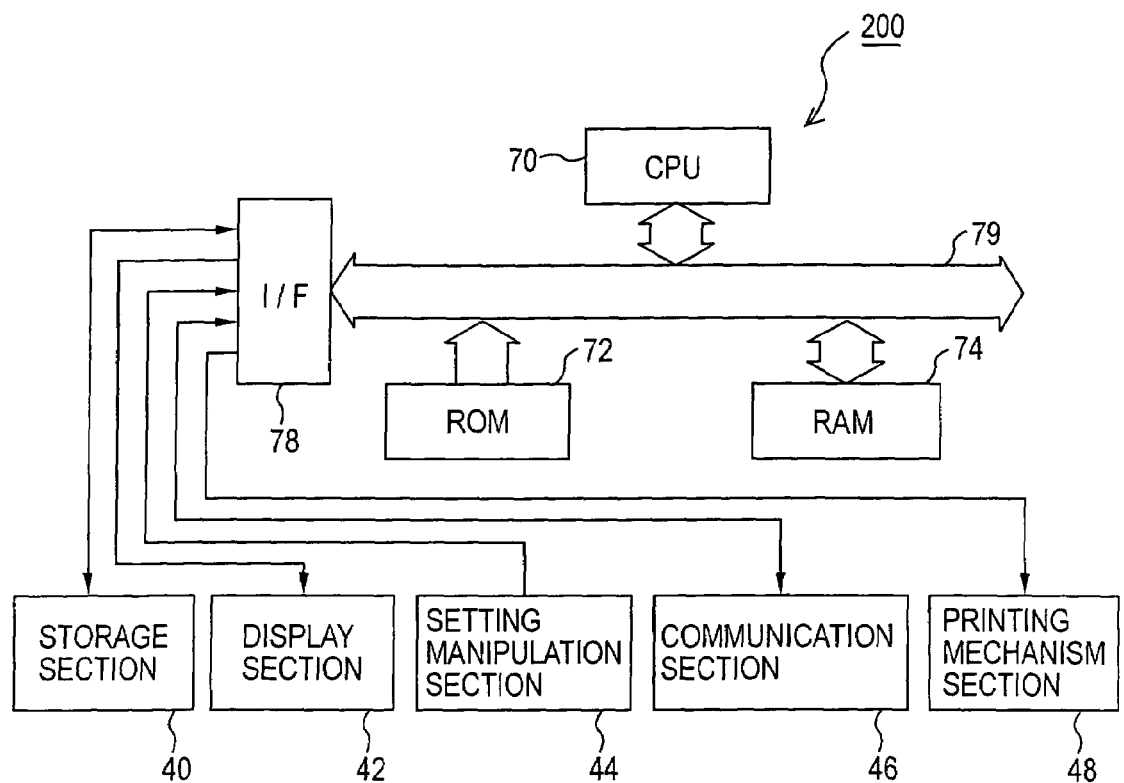
FIG. 11 is a schematic showing a hardware structure of the printer 200.

FIG. 11 is a schematic showing a hardware structure of the printer 200.

The printer 200 includes, as shown in FIG. 11, a CPU 70 to control operation and the whole system on the basis of control programs, a ROM 72 to store the control programs, etc., a RAM 74 for storing data read out from the ROM 72 or operation results required for operation by the CPU 70, and I/F 78 to interface input and output of data with external units, where the respective elements are connected to each other to transmit and receive data through a bus which is a signal line to transmit data. The storage section 40, the display section 42, the setting manipulation section 44, the communication section 46, and the printing mechanism section 58 are connected as the external units to the I/F 78.

The CPU 70 includes a micro processing unit (MPU), etc., and starts predetermined programs stored in a predetermined area of the ROM 72, thereby performing a data-existence responding process, a data supplying process, a hop count measuring process, and a printing control process shown in the flowcharts of FIGS. 12 to 15 in a time-division manner in accordance with the programs.

First, the data-existence responding process will be described in detail with reference to FIG. 12.

Figure 12:
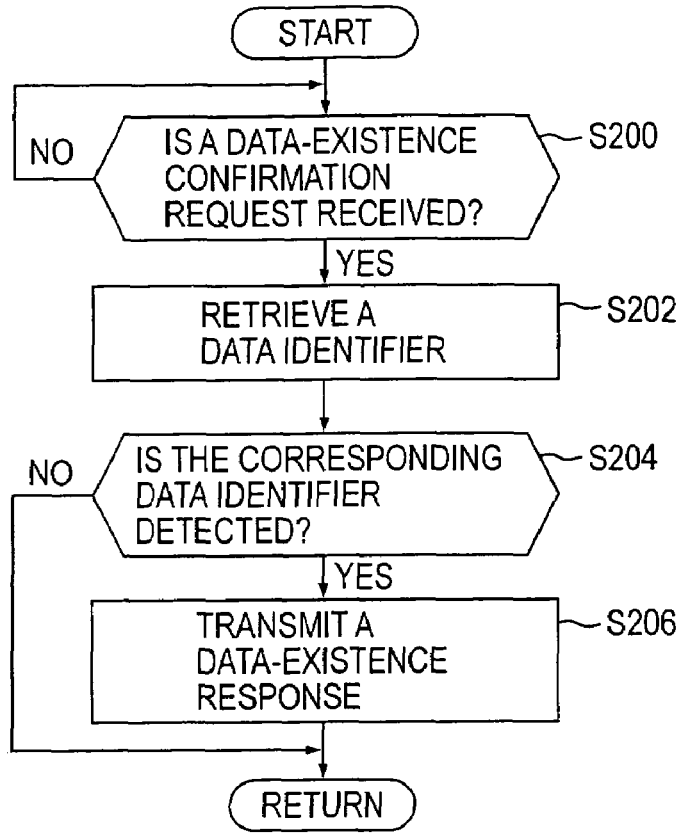
FIG. 12 is a flowchart illustrating a data-existence responding process.

FIG. 12 is a flowchart illustrating the data-existence responding process.

The data-existence responding process is a process of transmitting a response that the corresponding partial data 404 exist when the partial data exist in the storage section 40, in response to the data-existence confirmation request from printer 200, and when it is performed by the CPU 70, a step S200 is first performed, as shown in FIG. 12.

At the step S200, it is determined whether the data-existence confirmation request is received, and when it is determined that the data-existence confirmation request is received (Yes), a step S202 is performed. However, when it is determined that the data-existence confirmation request is not received (No), the step S200 is kept until the data-existence confirmation request is received.

At the step S202, the same data identifier 412 as the data identifier 412 included in the received data-existence confirmation request, is retrieved from the storage section 40, and at a step S204, and it is determined whether the corresponding data identifier 412 is detected. When it is determined that the corresponding data identifier 412 is detected (Yes), at a step S206, the data existence response is transmitted to the printer 200 as a request source, a series of processes are finished, and the original process is restored.

On the other hand, at the step S204, it is determined that the corresponding data identifier 412 is not detected (No), a series of processes are finished, and the original process is restored.

Next, the data supplying process will be described in detail with reference to FIG. 13.

Figure 13:
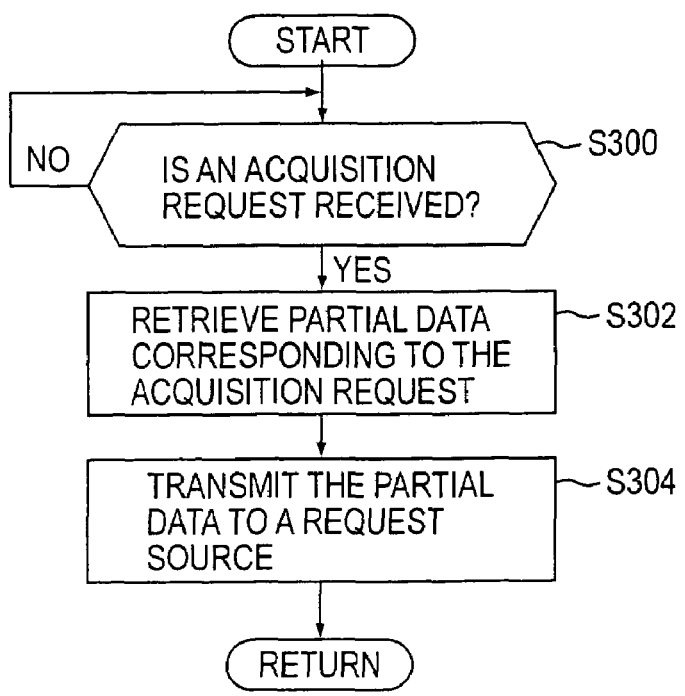
FIG. 13 is a flowchart illustrating a data supplying process.

FIG. 13 is a flowchart illustrating the data supplying process.

The data supplying process is a process of supplying the partial data 404 in response to the acquisition request from printer 200, and when it is performed by the CPU 70, a step S300 is first performed as shown in FIG. 13.

At the step S300, it is determined whether the acquisition request is received, and when it is determined that the acquisition request is received (Yes), a step S302 is performed. However, when it is determined that the acquisition request is not received (No), the step S300 is kept until the acquisition request is received.

At the step S302, the partial data 404 associated with the acquisition request are retrieved from the storage section 40, and at a step 304, the partial data 404 detected through the retrieval are transmitted to the printer 200 as a request source. Thereafter, a series of processes are finished, and the original process is restored.

Next, the hop count measuring process will be described in details with reference to FIG. 14.

Figure 14:
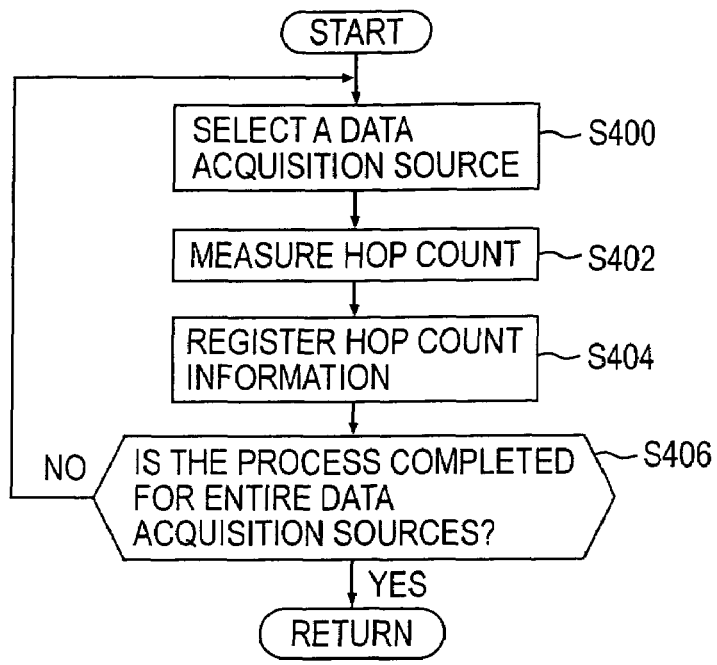
FIG. 14 is a flowchart illustrating a hop count measuring process.

FIG. 14 is a flowchart illustrating the hop count measuring process.

The hop count measuring process is a process of measuring a hop count indicating the number of connection stages of routers on a communication path with a data acquisition source every data acquisition source, and when it is performed by the CPU 70, a step S400 is first performed as shown in FIG. 14.

At the step S400, any one of a plurality of data acquisition sources is selected, and at a step S402, the hop count is measured by outputting a predetermined net command to the selected data acquisition source. Next, at a step S404, the hop-count information indicating the measured hop count is registered in the storage section 40 corresponding to the data acquisition source, and a step S406 is then performed.

At the step S406, it is determined whether the processes of the steps S400 to S404 are completed for entire data acquisition sources, and when it is determined that the processes are completed for entire data acquisition sources (Yes), a series of processes are finished and the original process is restored.

On the other hand, when it is determined at the step S406 that the processes of the steps S400 to S404 are not completed for entire data acquisition sources (No), the process of the step S400 is performed for the next data acquisition source.

Next, the printing control process will be described in detail with reference to FIG. 15.

Figure 15:
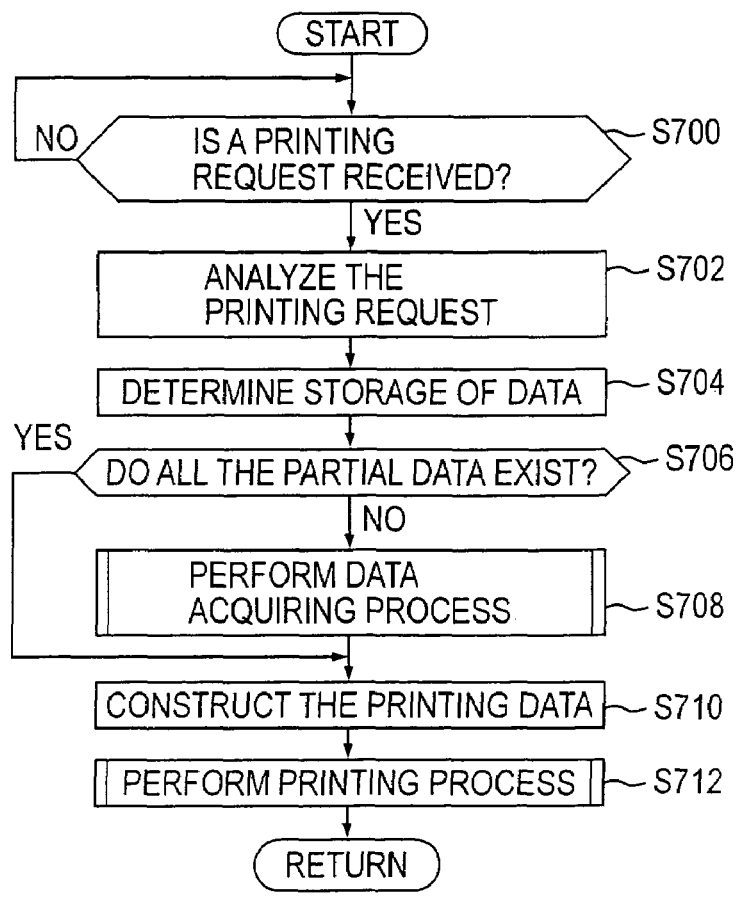
FIG. 15 is a flowchart illustrating a printing control process.

FIG. 15 is a flowchart illustrating the printing control process.

The printing control process is a process of performing the printing in response to the printing request from the client unit 100, and when it is performed by the CPU 70, a step S700 is first performed as shown in FIG. 15.

At the step S700, it is determined whether the printing request is received, and when it is determined that the printing request is received (Yes), a step S702 is performed. However, when it is determined that the printing request is not received (No), the step S700 is kept until the printing request is received. When it is determined at the step S700 that the partial data 404 are received together with the printing request, the received partial data 404 are stored in the storage section 40 corresponding to the data identifier 412 thereof.

At the step S702, the received printing request is analyzed, and at a step S704, it is determined on the basis of the analysis result whether necessary partial data 404 are stored in the storage section 40. Thereafter, a step S706 is performed.

At the step S706, it is determined on the basis of the determination result at the step S704 whether entire partial data 404 are stored. When it is determined that entire partial data 404 are not stored (No), at a step S708, the missing partial data 404 are acquired from the data acquisition sources, the acquired partial data 404 are stored in the storage section 40, and then a step S710 is performed.

At the step S710, the printing data 400 are constructed on the basis of the header information 402 included in the printing request and the partial data 404 of the storage section 40. At a step S712, the printing is performed by the printing mechanism section 58 on the basis of the constructed printing data 400, a series of processes are finished, and the original process is restored.

On the other hand, at the step S706, when it is determined on the basis of the determination result at the step S704 that entire necessary partial data 404 are stored (Yes), the step S710 is performed.

Next, the data acquiring process at the step S708 will be described in detail with reference to FIG. 16.

Figure 16:
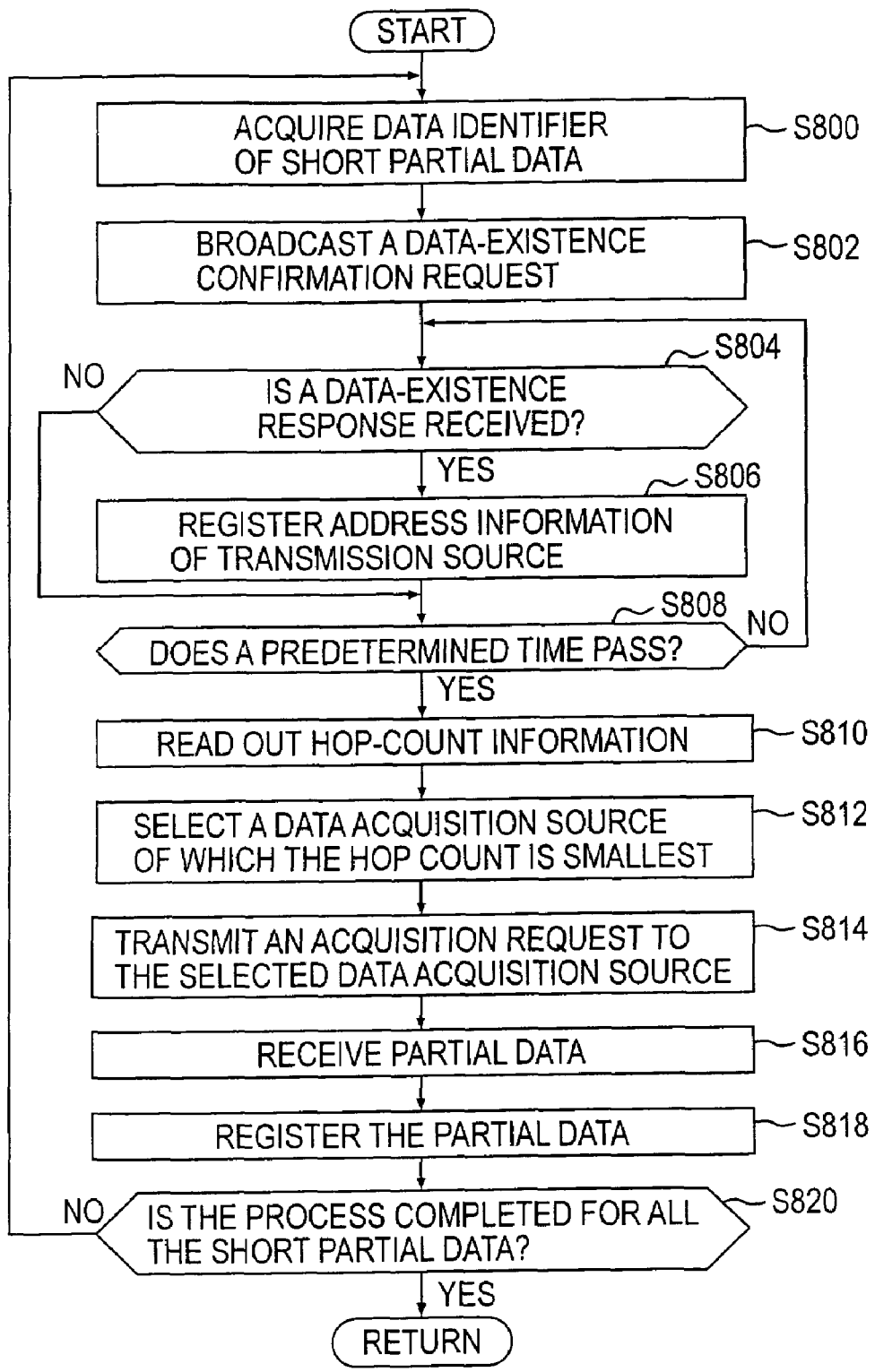
FIG. 16 is a flowchart illustrating a data acquiring process.

FIG. 16 is a flowchart illustrating the data acquiring process.

The data acquiring process is a process of acquiring the missing partial data 404 from the data acquisition sources, and when it is performed at the step S708, a step S800 is first performed as shown in FIG. 16.

At the step S800, the data identifier 412 corresponding to the missing partial data 404 is acquired from the printing request, and at a step S802, the data-existence confirmation request including the acquired data identifier 412 is broadcasted. Thereafter, a step S804 is performed.

At the step S804, it is determined whether the data-existence response is received, and when it is determined that the data-existence response is received (Yes), the address information of the transmission source of the data-existence response is registered in the storage section 40 corresponding to the data identifier 412. Then, at a step S808, it is determined whether a predetermined time (for example, several seconds) passes after the data-existence confirmation request is transmitted, and when it is determined that the predetermined time passes (Yes), a step S810 is performed.

At the step S810, the hop-count information corresponding to a data acquisition source is read out from the storage section 40 every data acquisition source corresponding to the same data identifier 412 of the missing partial data 404, and at a step S812, a data acquisition source of which the hop count is smallest is selected among the data acquisition sources on the basis of the read-out hop-count information. Then, a step S814 is performed.

At the step S814, the acquisition request is transmitted to the selected data acquisition source on the basis of the read-out address information, and at a step S816, the partial data 404 are received. Then, at a step S818, the received partial data 404 are stored in the storage section 40 corresponding to the data identifier 412, and a step S820 is then performed.

At the step S820, it is determined whether the processes of the steps S800 to S818 are completed for entire missing partial data 404, and when it is determined that the processes are completed for entire missing partial data 404 (Yes), a series of processes are finished and the original process is restored.

On the other hand, when it is determined at the step S820 that the processes of the steps S800 to S818 are not completed for entire missing partial data 404 (No), the step S800 is performed for the next missing partial data 404.

On the other hand, when it is determined at the step S808 that the predetermined time does not pass after the data-existence confirmation request is transmitted (No), the step S804 is performed.

On the other hand, when it is determined at the step S804 that the data-existence response is not received (No), the step S808 is performed.

Next, operation of this exemplary embodiment will be described.

In the printer 200, by repeatedly performing the steps S400 to S404, a hop count for a data acquisition source is measured every data acquisition source, and the hop-count information indicating the measured hop count is stored in the storage section 40 corresponding to the data acquisition source. It is supposed that the measurement of the hop count is previously performed in entire printers 200.

When a user performs the printing of document data, the user instructs the printing of the document data and designates a printer 200 to carry out the printing, using the client unit 100.

In the client unit 100, when the printing instruction and the designation of the printer 200 are input, the printing data 400 are generated on the basis of the document data of which the printing is instructed by the user through the step S104. Through the step S108, the header information 402 is acquired from the generated printing data 400 and the printing request including the acquired header information 402 is transmitted to the designated printer 200 (hereinafter, referred to as printer A). Further, if new partial data 404 are included in the printing data 400, the partial data 404 are transmitted to the printer A together with the printing request.

In the printer A, when the partial data 404 are received together with the printing request, the received partial data 404 are stored in the storage section 40 corresponding, to the data identifier 412 thereof. Through the steps S702 and S704, the received printing request is analyzed and it is determined whether the necessary partial data 404 are stored in the storage section 40. As a result, when it is determined that entire necessary partial data 404 are not stored, the data identifier 412 of the missing partial data 404 is acquired from the printing request and the data-existence confirmation request including the acquired data identifier 412 is broadcasted, through the steps S800 and S802.

In another printer 200, when the data-existence confirmation request is received, the same data identifier 412 as the data identifier 412 included in the received data-existence confirmation request, is retrieved from the storage section 40 through the step S202. As a result, when the corresponding data identifier 412 is detected, the data-existence response is transmitted to the printer A through the step S206.

In the printer A, when the data-existence response is received within a predetermined time, the address information of the transmission source of the data-existence response is registered in the storage section 40 corresponding to the data identifier 412 through the step S806. Thereafter, the hop-count information corresponding to the data acquisition source is read out from the storage section 40 every data acquisition source and a data acquisition source (hereinafter, referred to as printer B) of which the hop count is smallest, is selected among the data acquisition sources on the read-out hop-count information, through the steps S810 and S812. Then, through the step S814, the acquisition request is transmitted to the selected data acquisition source on the basis of the read-out address information.

In the printer B, when the acquisition request is received, since the corresponding partial data 404 exist, the partial data 404 associated with the acquisition request are retrieved from the storage section 40 and the partial data 404 detected through the retrieval are transmitted to the printer A, through the steps S302 and S304.

In the printer A, when the missing partial data 404 are received, the received partial data 404 are stored in the storage section 40 corresponding to the data identifier 412 thereof through the step S818. This process is performed to entire missing partial data 404. Then, when entire necessary partial data 404 are prepared, the printing data 400 are constructed on the basis of the header information 402 included in the printing request and the partial data 404 of the storage section 40 and the printing is performed by the printing mechanism section 58 on the basis of the constructed printing data 400, through the steps S710 and S712.

This exemplary embodiment of the present invention will be described with reference to FIG. 17.

Figure 17:
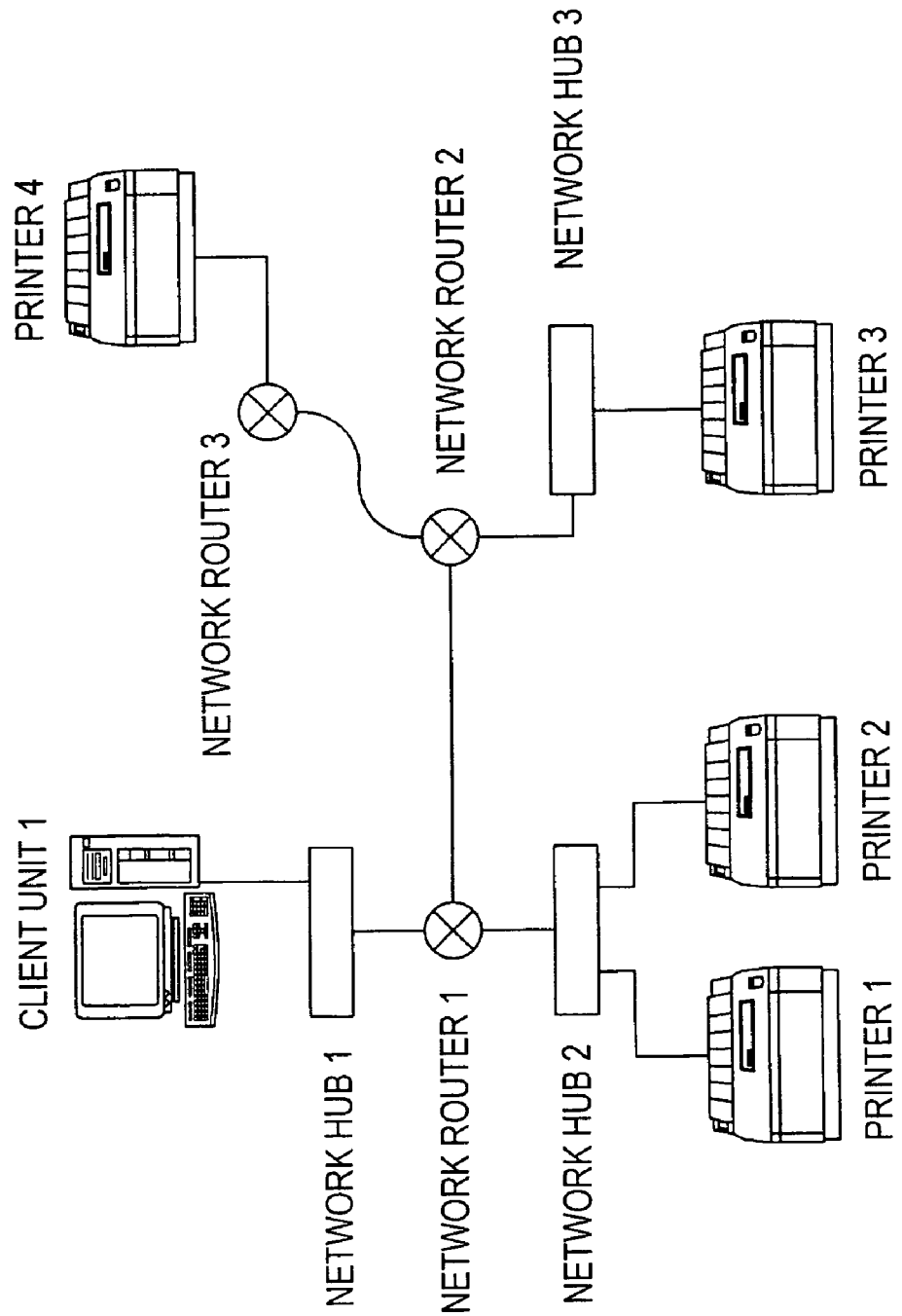
FIG. 17 is a schematic showing an example of a network structure of a printing system.

FIG. 17 is a schematic showing an example of a network structure of the printing system.

As shown in FIG. 17, Client unit 1 is connected to Network router 1 through Network hub 1, and Printers 1 and 2 are also connected thereto through Network hub 2. Printer 3 is connected to Network router 2 through Network hub 3, and Network routers 1 and 3 are also connected thereto. Printer 4 is connected to Network router 3.

For example, it is supposed that partial data 404 necessary for the printing in Printer 2 are not stored in Printer 2 but in Printers 1 and 3. In this case, since the hop count from Printer 2 is "0" for Printer 1 and "2" for Printer 3, Printer 2 selects Printer 1, of which the hop count is smaller, as a data acquisition source.

In this way, in this exemplary embodiment, the client unit 100 generates the printing data 400, which is divided to correspond to respective constituent parts constituting printing contents and transmits the printing request including the header information 402, to a printer 200. When the printing request is received, the printer 200 analyzes the received printing request, determines whether the missing partial data 404 are stored in the storage section 40, acquires the missing partial data 404 from another printer 200 of which the hop count is smallest, stores the acquired partial data 404 in the storage section 40, constructs the printing data 400 on the basis of the partial data 400 in the storage section 40, and performs the printing on the basis of the constructed printing data 400. In addition, the printer 200 retrieves the partial data 404 from the storage section 40 in response to the acquisition request and transmits the partial data 404 detected through the retrieval to a printer 200 as a request source.

Accordingly, when a part of the printing data 400 necessary for the printer 200 correspond to the printing data 400 in the storage section 40 and the other part is different therefrom, only the different part of data is transmitted through a network, so that it is possible to reduce the traffic and to reduce the time for the first printout, compared with the related art. In addition, since the partial data 404 are acquired from a printer 200 whose communication distance in the network is smaller among a plurality of printers 200, the acquisition of the partial data 404 can be carried out at relatively high speed, so that it is possible to further reduce the time for the first printout.

Furthermore, in this exemplary embodiment, the printer 200 acquires partial data 404 from a printer for which the hop count is smallest among the plurality of printers 200.

As a result, since the partial data 404 are acquired from a printer 200 whose communication distance in the network is smaller among a plurality of printers 200, the acquisition of the partial data 404 can be carried out at relatively-high speed, so that it is possible to further reduce the time for the first printout.

In the first exemplary embodiment, the client unit 100 corresponds to the printing request unit in any one of Aspects 2, 46 and 47, the printing-data generating section 20 and the step S104 correspond to the printing-data generating device in Exemplary Aspect 2, and the step S104 corresponds to the printing-data generating step in Exemplary Aspect 47. The printing-request transmitting section 24, the communication section 18, and the step S108 correspond to the printing-request transmitting device in Exemplary Aspect 2, and the step S108 corresponds to the printing-request transmitting step in Exemplary Aspect 47.

Further, in the first exemplary embodiment, the printer 200 corresponds to the data processor in any one of Exemplary Aspects 1, 15, 30 and 45, and the storage section 40 corresponds to the data storage device in any one of Exemplary Aspects 1, 2, 7, 15 to 17, 22, 30 to 32, 37, 45 to 47 and 52, hop-count information storage device in any one of aspects 3, 18, 33, and 48, and the address-information storage device in any one of Exemplary Aspects 7, 22, 37 and 52. The printing-request receiving section 48, the communication section 46 and the step S700 correspond to the printing-request receiving device in Aspect 2 or 17, the step S700 corresponds to the printing-request receiving step in Exemplary Aspect 32 or 47, and the data-storage determining section 50 and the steps S702 and S704 correspond to the data-storage determining device in Exemplary Aspect 2 or 17.

Furthermore, in the first exemplary embodiment, the steps S702 and S704 correspond to the data-storage determining step in Exemplary Aspect 32 or 47, and the data acquiring section 52, the communication section 46, and the steps S810 to S816 correspond to the partial-data acquiring device in any one of Exemplary Aspects 1 to 3, 7, 15 to 18 and 22. The steps S810 to S816 correspond to the partial-data acquiring step in any one of Exemplary Aspects 30 to 33, 37, 45 to 48 and 52, the storage-data registering section 54 and the step S818 correspond to the storage-data registering device in any one of Exemplary Aspects 2, 7, 17 and 22, and the step S818 corresponds to the storage-data registering step in any one of Exemplary Aspects 32, 37 and 47.

Furthermore, in the first exemplary embodiment, the data supply section 55, the communication section 46, and the steps S300 to S304 correspond to the storage-data retrieving device in any one of Exemplary Aspects 1, 2, 15 and 16 or the partial-data transmitting device in any one of Exemplary Aspects 1, 2, 15 and 16, and the steps S300 to S304 correspond to the storage-data retrieving step in any one of Exemplary Aspects 30, 31, 45 and 46 or the partial-data transmitting step in any one of Exemplary Aspects 30, 31, 45 and 46. The printing-data constructing section 56 and the step S710 correspond to the process-data constructing device in Exemplary Aspect 1 and 15 or the printing-data constructing device in any one of Exemplary Aspects 2, 16 and 17, and the step S710 corresponds to the process-data constructing step in any one of Exemplary Aspects 30 and 45 or the printing-data constructing step in any one of Exemplary Aspects 31, 32, 46 and 47.

Furthermore, in the first exemplary embodiment, the printing mechanism section 58 and the step S712 correspond to the printing device in Exemplary Aspect 2 or 16, the step S712 corresponds to the printing step in Exemplary Aspect 31 or 46, and the data managing section 60, the communication section 46 and the steps S200 to S206 correspond to the first data managing device in Exemplary Aspect 7 or 22. The steps S200 to S206 correspond to the first data managing device in Exemplary Aspect 37, the data managing section 60, the communication section 46 and the steps S800 to S808 correspond to the second data managing device in Exemplary Aspect 7 or 22, and the steps S800 to S808 correspond to the second data managing step in Exemplary Aspect 37.

Furthermore, in the first exemplary embodiment, the printing data 400 correspond to the process data in any one of Exemplary Aspects 1, 15, 30 and 45, the layout information 414 corresponds to the structure information of Exemplary Aspects 2, 17, 32 and 47, and the data identifier 412 corresponds to the identification information in any one of Exemplary Aspects 2, 7, 17, 22, 32, 37, 47 and 52.

Figure 18:
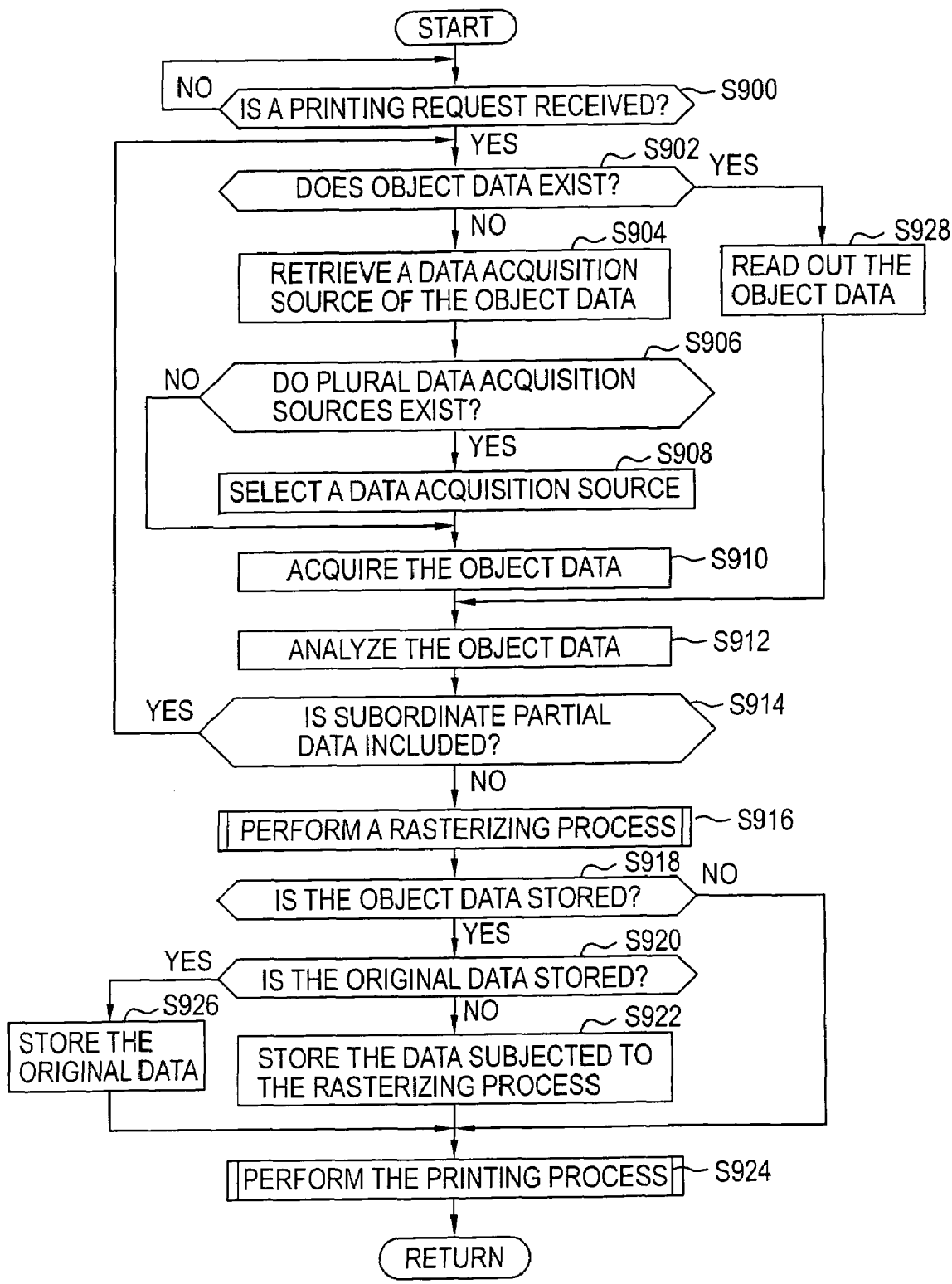
FIG. 18 is a flowchart illustrating the printing control process which is performed by the printer 200.

Next, a second exemplary embodiment of the present invention will be described with reference to the figures. FIG. 18 is the second exemplary embodiment of the network data processing system, a network printing system, a data processor, a printer, a data processing program, a print processing program, a network data processing method, and a network printing method according to exemplary embodiments of the present invention.

In this exemplary embodiment, the network data processing system, a network printing system, a data processor, a printer, a data processing program, a print processing program, a network data processing method, and a network printing method according to exemplary embodiments of the present invention are applied to a case where the printer 200 performs the printing in response to the printing request from the client unit 100, as shown in FIG. 1. The second exemplary embodiment is different from the first exemplary embodiment in that the original data stored in the client unit 100 and the data subjected to a rasterizing process and stored in the printer 200 are selectively shared. The rasterizing process is a process of converting a format of data transmitted to the printer 200 from the client unit 100 into a format suitable for input to a printing section of the printer 200, and includes, for example, a process of developing the compressed image data, a developing process into a bit map on the basis of text data and font data, an image-resolution converting process in accordance with a resolution of the printing section, a color converting process in accordance with a color scheme and a color development characteristic of the printing section, and a process of transforming bit-map lines in accordance with a printing order of the printing section. Now, only elements different from the first exemplary embodiment will be described, the same elements as the first exemplary embodiment are denoted by the same reference numerals, and descriptions thereof will be omitted.

First, a software structure of the printer 200 will be described.

The printer 200 allows the CPU 70 to start a predetermined program stored in a predetermined area of the ROM 72, thereby performing the printing control process shown in the flowchart of FIG. 18, in place of the printing control process shown in the flowchart of FIG. 15, in accordance with the program.

FIG. 18 is a flowchart illustrating the printing control process which is performed in the printer 200.

The printing control process is a process of performing the printing in response to the printing request from the client unit 100, and when it is performed by the CPU 70, a step S900 is first performed as shown in FIG. 18.

At the step S900, it is determined whether a printing request is received, and when it is determined that the printing request has been received (Yes), a step S902 is performed. However, when it is determined that the printing request has not been received (No), the step S900 is kept until the printing request is received.

At the step S902, the received printing request is analyzed, and it is determined whether object data (which include the original data of the printing data 400 or the partial data 404, data subjected to the rasterizing process, and data having the other formats) necessary for the printing are stored in the storage section 40. When it is determined that the object data are stored (Yes), a step S904 is performed.

At the step S904, it is retrieved that any data acquisition source among a plurality of data acquisition sources, stores the object data, and it is determined at a step S906 whether the corresponding data acquisition source exists plurally on the basis of the confirmation result. When it is determined that the plural data acquisition sources exist (Yes), a step S908 is performed.

At the step S908, one of the plural data acquisition sources is selected in accordance with a predetermined selection condition (that the hop count or the arrival distance or the communication cost is smallest), and at a step S910, the object data are acquired from the selected data acquisition source. Thereafter, a step S912 is performed.

At the step S912, the acquired object data is analyzed, and at a step S914, it is determined whether the partial data 404 are included in a subordinate hierarchy of the object data. When it is determined that the partial data 404 are not included in the subordinate hierarchy of the object data (No), a step S916 is performed.

At the step S916, the object data are subjected to the rasterizing process, and at a step S918, it is determined in accordance with a predetermined storage condition whether the object data are stored in the storage section 40. When it is determined that the object data are stored (Yes), a step S920 is performed.

At the step S920, it is determined in a predetermined storage condition whether the object data are stored as the original data or as the data subjected to the rasterizing process, and when it is determined that the object data are stored as the data subjected to the rasterizing process (No), the data subjected to the rasterizing process are stored in the storage section 40 at a step S922. Thereafter, a step S924 is performed.

At the step S924, the printing is performed by the printing mechanism section 58 on the basis of the data subjected to the rasterizing process, a series of processes are finished, and the original process is restored.

On the other hand, when it is determined at the step S920 that the object data are stored as the original data (Yes), the original data of the object data are stored in the storage section 40 at a step S926, and then the step S924 is performed.

On the other hand, when it is determined at the step S918 that the object data are not stored in the storage section 40 (No), the step S924 is performed.

On the other hand, when it is determined at the step S914 that the partial data 404 are included in the subordinate hierarchy of the object data (Yes), the partial data 404 are utilized as the object data, and then the step S902 is performed.

On the other hand, when it is determined at the step S906 that only one data acquisition source exists (No), the step S910 is performed.

On the other hand, when it is determined at the step S902 that the object data are stored in the storage section 40 (Yes), the object data are read out from the storage section 40 at a step S928, and then the step S912 is performed.

Next, operation of this exemplary embodiment will be described.

For example, for Image E included in the document data, it is supposed that the partial data 404 of Image E are stored in the printer 200. It is also supposed that the size of the data before the rasterizing process is 2 Mbyte, the size of the data after the rasterizing process is 20 Mbyte, and a process time necessary for the rasterizing process is 3 seconds. In this case, when the partial data 404 subjected to the rasterizing process are stored, the data-size information before and after the rasterizing process is stored corresponding to the process time thereof.

For example, in the printing system shown in FIG. 17, it is supposed that Printer 2 requires the partial data 404 of Image E, Client unit 1 stores the original data of Image E, and Printer 1 stores the data of Image E subjected to the rasterizing process. It is also supposed that the average line speed between Printer 1 and Printer 2 is 50 Mbps and the average line speed between Client unit 1 and Printer 2 is 8 Mbps. Here, the average line speed is determined by synthetically considering the transmission ability of a data transmission party, the transmission ability including network appliances in the data path, and the reception ability of a data reception party. It is also supposed that Printer 1 and Printer 2 have the same rasterizing process ability.

In this case, when using the data subjected to the rasterizing process, which are stored in Printer 1, 3.2 seconds (data capacity 20 Mbyte=160 Mbit, 160 Mbit÷line speed 50 Mbps=3.2 seconds) is required to prepare the data of Image E subjected to the rasterizing process after the data transmission request in Printer 2.

On the contrary, when using the original data stored in Client unit 1, 5 seconds (data capacity 2 Mbyte=16 Mbit, 16 Mbit÷line speed 8 Mbps=2 seconds, process time for the rasterizing process in Printer 2: 3 seconds) is required to prepare the data of Image E subjected to the rasterizing process after the data transmission request in Printer 2.

Therefore, in this example, the transmission of the data subjected to the rasterizing process in Printer 1 is selected, since the required time thereof is shorter.

Similarly, in the printing system shown in FIG. 17, it is supposed that Printer 3 requires the partial data 404 of Image E, Client unit 1 stores the original data of Image E, and Printer 1 stores the data of Image E subjected to the rasterizing process. It is also supposed that the average line speed between Printer 1 and Printer 3 is 20 Mbps, and the average line speed between Client unit 1 and Printer 3 is 8 Mbps. It is also supposed that Printer 1 and Printer 3 have the same rasterizing process ability.

In this case, when using the data subjected to the rasterizing process, which are stored in Printer 1, 8 seconds (data capacity 20 Mbyte=160 Mbit, 160 Mbit÷line speed 20 Mbps=8 seconds) is required to prepare the data of Image E subjected to the rasterizing process after the data transmission request in Printer 3.

On the contrary, when using the original data stored in Client unit 1, 5 seconds is required similarly to the aforementioned example.

Therefore, in this example, the transmission of the original data in Printer 1 is selected, since the required time thereof is shorter.

In this way, in this exemplary embodiment, for the partial data 404 before and after the rasterizing process, the optimum data format and the data acquisition source are selected in consideration of the process time and the transmission time.

As a result, it is possible to effectively reduce the time for the first printout and the time for the printing.

In the first and second exemplary embodiments, the printer 200 selects a data acquisition source of which the hop count is smallest among a plurality of data acquisition sources and acquires the partial data 404 from the selected data acquisition source. However, in a case where plural communication paths exist for the same data acquisition source, it is constructed as follows.

For each data acquisition source, the hop-count information indicating the number of connection stages of routers in a communication path with the data acquisition source and the communication-path information specifying the communication path are registered in the storage section 40 corresponding to the data acquisition source.

When plural data acquisition sources corresponding to the same data identifier 412 of the missing partial data 404 exist, the data acquiring section 52 reads out the hop-count information corresponding to the data acquisition source from the storage section 40 for each data acquisition source, and selects a data acquisition source whose the hop count is smallest among the plural data acquisition sources, on the basis of the read-out hop-count information. Next, the data acquiring section reads out address information corresponding to the selected data acquisition source from the storage section 40, and transmits the acquisition request to the selected data acquisition source on the basis of the read-out address information. The data acquiring section reads out communication-path information corresponding to the selected data acquisition source from the storage section 40, and acquires the partial data 404 through the communication path, which is specified from the communication-path information corresponding to the selected data acquisition source, on the basis of the read-out address information and the read-out communication-path information. On the other hand, when only one data acquisition source corresponding to the same data identifier 412 of the missing partial data 404 exists, the data acquiring section reads out the address information corresponding to the data acquisition source from the storage section 40, and transmits the acquisition request to the data acquisition source on the basis of the read-out address information. Then, the data acquisition section reads out the communication-path information corresponding to the data acquisition source from the storage section 40, and acquires the partial data 404 through the communication path, which is specified from the communication-path information corresponding to the data acquisition source, on the basis of the read-out address information and the read-out communication-path information. The acquisition request may be transmitted through an arbitrary communication path, since the acquisition request has a small communication data capacity.

Figure 19:
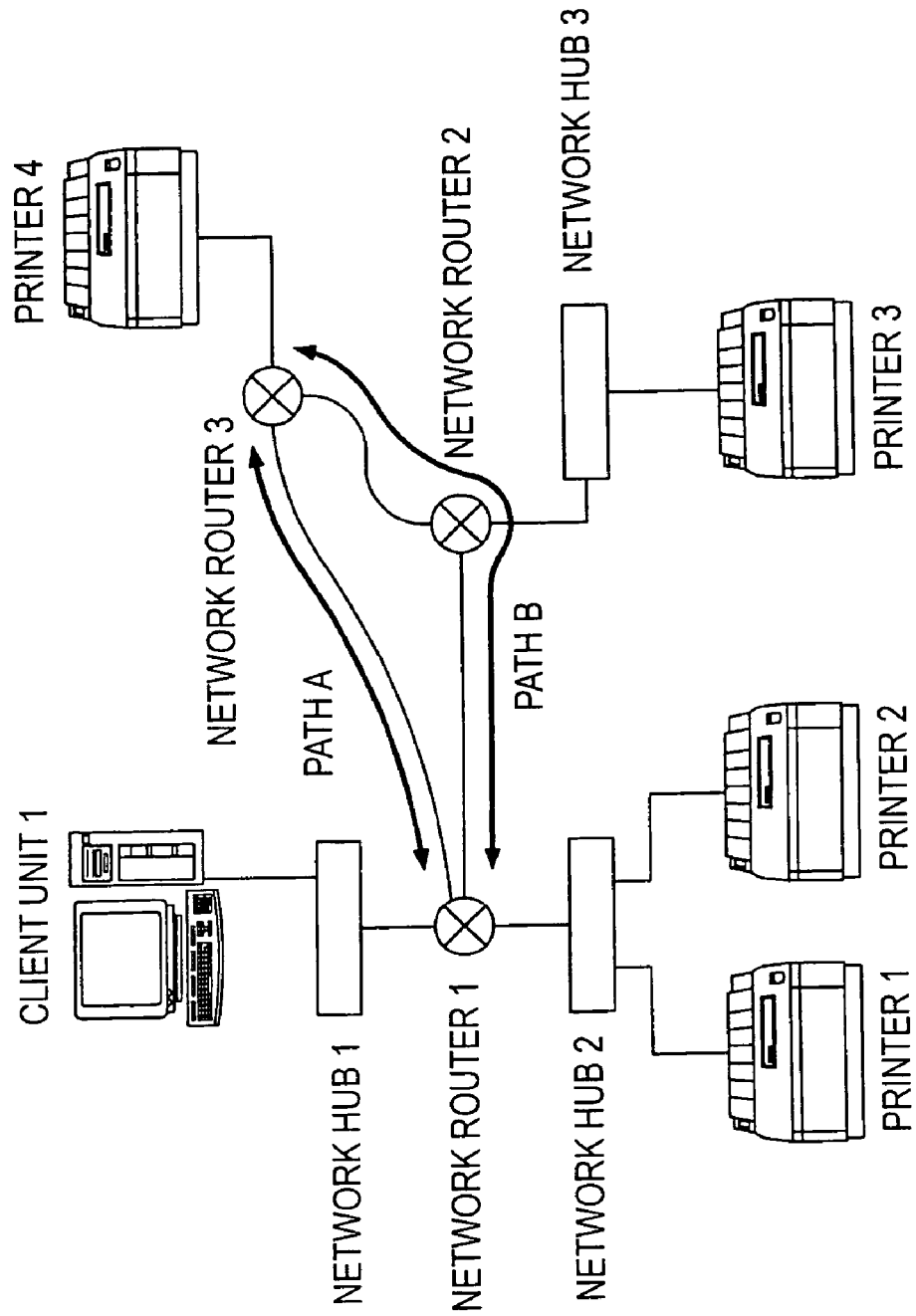
FIG. 19 is a schematic showing an example of the network structure of the printing system when a plurality of communication paths exist for one data acquisition source.

FIG. 19 is a schematic showing an example of the network structure of the printing system when plural communication paths exist for one data acquisition source.

In the example of FIG. 19, Printer 1 acquires the partial data 404 from Printer 4, and two communication paths A and B exist in Printer 4 as seen from Printer 1. The hop count of the communication path A is "2", and the hop count of the communication path B is "4". In this case, Printer 1 acquires the partial data 404 through the communication path A from Printer 4, since the hop count of the communication path A is smaller.

Accordingly, it is possible to more surely acquire the partial data 404 from a printer for which the communication distance in the network is smallest among the plurality of printers 200.

In this case, the storage section 40 corresponds to the hop-count information storage device in any one of Exemplary Aspects 4, 19, 34, and 49, and the data acquiring section 52 corresponds to the partial data acquiring device in Exemplary Aspect 4 or 19.

In the first and second exemplary embodiments, the printer 200 selects a data acquisition source of which the hop count is smallest among a plurality of data acquisition sources and acquires the partial data 404 from the selected data acquisition source. However, the present invention is not limited to the exemplary embodiments, but may be constructed such that the arrival time until a packet arrives at the data acquisition source is measured every data acquisition source, the arrival-time information indicating the measured arrival time is registered in the storage section 40 corresponding to the data acquisition source, a data acquisition source of which the arrival time is shortest is selected among the plurality of data acquisition sources on the basis of the arrival-time information stored in the storage section 40, and the partial data 404 are acquired from the selected data acquisition source.

For example, in the example of FIG. 17, it is supposed that the partial data 404 necessary for the printing in Printer 3 are not stored in Printer 3, but in Printers 1 and 4. It is also supposed that the line capacity is small between Network router 1 and Network router 2 and the data transmission therebetween requires much time. In this case, since Printer 4 of Printers 1 and 4 has a shorter arrival time in communication with Printer 3, Printer 4 of which the hop count is smaller is selected as the data acquisition source by Printer 3. It may be also considered that the optimum data acquisition source is selected on the basis of the line capacity between the respective units and the data capacity required for communication.

As a result, since the partial data 404 are acquired from the printer for which the communication time in the network is shortest, among the plurality of printers 200, it is possible to perform the acquisition of the partial data 404 at relatively-high speed, so that it is possible to accomplish reduction in time for the first printout.

In this case, the storage section 40 corresponds to the arrival-time information storage device in any one of Exemplary Aspects 5, 20, 35, and 50.

When plural communication paths exist for the same data acquisition source, the present invention can be constructed as follows.

For each data acquisition source, the arrival-time information indicating an arrival time until a packet arrives at a data acquisition source and the communication-path information specifying a communication path with the data acquisition source are registered in the storage section 40 corresponding to the data acquisition source.

When plural data acquisition sources corresponding to the same data identifier 412 of the missing partial data 404 exist, the data acquiring section 52 reads out the arrival-time information corresponding to the data acquisition source from the storage section 40 for each data acquisition source, and selects a data acquisition source whose arrival time is shortest, among the plural data acquisition sources, on the basis of the read-out arrival-time information. Next, the data acquiring section reads out address information corresponding to the selected data acquisition source from the storage section 40, and transmits the acquisition request to the selected data acquisition source on the basis of the read-out address information. The data acquiring section reads out communication-path information corresponding to the selected data acquisition source from the storage section 40, and acquires the partial data 404 through the communication path, which is specified from the communication-path information corresponding to the selected data acquisition source, on the basis of the read-out address information and the read-out communication-path information. On the other hand, when only one data acquisition source corresponding to the same data identifier 412 of the missing partial data 404 exists, the data acquiring section reads out the address information corresponding to the data acquisition source from the storage section 40, and transmits the acquisition request to the data acquisition source on the basis of the read-out address information. Then, the data acquisition section reads out the communication-path information corresponding to the data acquisition source from the storage section 40, and acquires the partial data 404 through the communication path, which is specified from the communication-path information corresponding to the data acquisition source, on the basis of the read-out address information and the read-out communication-path information. The acquisition request may be transmitted through an arbitrary communication path, since the acquisition request has a small communication data capacity.

As a result, it is possible to more surely acquire the partial data 404 from a printer for which the communication time in the network is shortest, among a plurality of printers 200.

In this case, the storage section 40 corresponds to the arrival-time information storage device in any one of Exemplary Aspects 6, 21, 36, and 51, and the data acquiring section 52 corresponds to the partial-data acquiring device in Exemplary Aspect 6 or 21.

In the first and second exemplary embodiments, the printer 200 selects a data acquisition source of which the hop count is smallest among a plurality of data acquisition sources and acquires the partial data 404 from the selected data acquisition source. However, the present invention is not limited to the above exemplary embodiments, but may be constructed such that the communication cost for communication with the data acquisition source is measured every data acquisition source, the communication-cost information indicating the measured communication cost is registered in the storage section 40 corresponding to the data acquisition source, a data acquisition source whose communication cost is smallest is selected among the plurality of data acquisition sources on the basis of the communication-cost information stored in the storage section 40, and the partial data 404 are acquired from the selected data acquisition source.

For example, in the example of FIG. 17, it is supposed that the partial data 404 necessary for the printing in Printer 3 are not stored in Printer 3, but in Printers 1 and 4. It is also supposed that Network router 2 and Network router 3 are connected through a public line of a metered accounting type, and the other communication paths are connected through an exclusive line of a fixed accounting type. In this case, since Printer 1 out of Printers 1 and 4 has the smaller communication cost in communication with Printer 3, Printer 1 of which the hop count is smaller is selected as the data acquisition source by Printer 3.

As a result, since the partial data 404 are acquired from the printer for which the communication cost is smallest among the plurality of printers 200, it is possible to relatively reduce the printing cost.

In this case, the storage section 40 corresponds to the communication-cost information storage device in any one of Exemplary Aspects 13, 28, 43, and 58.

When plural communication paths exist for the same data acquisition source, the present invention can be constructed as follows.

For each data acquisition source, the communication-cost information indicating communication cost required for communication with the data acquisition source and the communication-path information specifying a communication path with the data acquisition source are registered in the storage section 40 corresponding to the data acquisition source.

When plural data acquisition sources corresponding to the same data identifier 412 of the missing partial data 404 exist, the data acquiring section 52 reads out the communication-cost information corresponding to the data acquisition source from the storage section 40 for each data acquisition source, and selects a data acquisition source whose communication cost is smallest among the plural data acquisition sources, on the basis of the read-out communication-cost information. Next, the data acquiring section reads out address information corresponding to the selected data acquisition source from the storage section 40, and transmits the acquisition request to the selected data acquisition source on the basis of the read-out address information. The data acquiring section reads out communication-path information corresponding to the selected data acquisition source from the storage section 40, and acquires the partial data 404 through the communication path, which is specified from the communication-path information corresponding to the selected data acquisition source, on the basis of the read-out address information and the read-out communication-path information. On the other hand, when only one data acquisition source corresponding to the same data identifier 412 of the missing partial data 404 exists, the data acquiring section reads out the address information corresponding to the data acquisition source from the storage section 40, and transmits the acquisition request to the data acquisition source on the basis of the read-out address information. Then, the data acquisition section reads out the communication-path information corresponding to the data acquisition source from the storage section 40, and acquires the partial data 404 through the communication path, which is specified from the communication-path information corresponding to the data acquisition source, on the basis of the read-out address information and the read-out communication-path information. The acquisition request may be transmitted through an arbitrary communication path, since the acquisition request has a small communication data capacity.

As a result, it is possible to more surely acquire the partial data 404 from a printer for which the communication cost is smallest among a plurality of printers 200.

In this case, the storage section 40 corresponds to the communication-cost information storage device in any one of Exemplary Aspects 14, 29, 44, and 59, and the data acquiring section 52 corresponds to the partial-data acquiring device in Exemplary Aspect 14 or 29.

The optimum data acquisition source may be selected in consideration of two or more from hop count, arrival time, and communication cost.

For example, by synthetically considering the data delay due to the hop count or the communication distance and the communication time due to the line capacity or the data capacity necessary for communication, a data acquisition source of which the data communication is finished earliest, is selected.

For example, by synthetically considering the communication time and the communication cost, the optimum data acquisition source is selected in accordance with a previously-set determination criterion (balance between necessary cost and communication time) or in response to instruction by a user.

In the first and second exemplary embodiments, a printer 200 refers to the plural printers 200 through broadcasting for the missing partial data 404. However, the present invention is not limited to the above exemplary embodiments, but may be constructed such that the printer 200 notifies the other printers 200 of the partial data 404 stored in the printer through broadcasting. Specifically, the present invention may be constructed as follows.

For each partial data 404 in the storage section 40, the printer 200 reads out the data identifier 412 corresponding to the partial data 404 from the storage section 40, and broadcasts the data-existence notification including the read-out data identifier 412.

When the data-existence notification is received, the printer 200 registers the address information of the transmission source of the data-existence notification in the storage section 40 corresponding to the data identifier 412 included in the received data-existence notification, acquires the data identifier 412 of the missing partial data 404 from the printing request, reads out the address information corresponding to the acquired data identifier 412 from the storage section 40, and transmits the acquisition request to the data acquisition source of the partial data 404 on the basis of the read-out address information, thereby acquiring the partial data 404. On the other hand, for each partial data in the storage section 40, the printer reads out the data identifier 412 corresponding to the partial data 404 from the storage section 40, and broadcasts the data-existence notification including the read-out data identifier 412.

In this case, the storage section 40 corresponds to the data storage device in any one of Exemplary Aspects 8, 23, 38 and 53 or the address-information storage device in any one of Exemplary Aspects 8, 23, 38 and 53, and the data identifier 412 corresponds to the identification information in any one of Exemplary Aspects 8, 23, 38 and 53.

In the first and second exemplary embodiments, a printer 200 refers to the other printers 200 through broadcasting for the missing partial data 404. However, the present invention is not limited to the above exemplary embodiments, but may be constructed such that a printer 200 refers to a specific printer 200 for the missing partial data 404, receives the address information from the printer 200, and acquires the missing partial data 404. Specifically, the present invention may be constructed as follows.

A printer 200 acquires the data identifier 412 of the partial data 404 stored in the storage section 40, and registers its own address information in the storage section 40 corresponding to the acquired data identifier 412. When a data-existence notification is received, the printer registers the address information of the transmission source of the data-existence notification in the storage section 40 corresponding to the data identifier 412 included in the received data-existence notification. When a data-existence confirmation request is received, the printer reads out the address information corresponding to the data identifier 412 included in the received data-existence confirmation request from the storage section 40, and transmits a data-existence response including the read-out address information to the printer 200 as the request source.

The printer 200 acquires the data identifier 412 of the missing partial data 404, and transmits the data-existence confirmation request including the acquired data identifier 412 to the printer 200. When the data-existence response is received, the printer transmits the acquisition request to the data acquisition source on the basis of the address information included in the received data-existence response, thereby acquiring the partial data 404. The printer acquires the data identifier 412 of the partial data 404 stored in the storage section 40, and transmits the data-existence notification including the acquired data identifier 412 to the printer 200.

As a result, since the partial data 404 stored in the printer 200 are managed by the specific printer 200, the printer 200 can acquire the partial data 404 stored in the data acquisition source, only by referring to the specific printer 200.

In this case, the storage section 40 corresponds to the data storage device in any one of Exemplary Aspects 9, 10, 24, 25, 39, 40 and 55 or the address-information storage device in any one of Exemplary Aspects 9, 10, 24, 25, 39, 40, 54 and 55, and the data identifier 412 corresponds to the identification information in any one of Exemplary Aspects 9, 10, 24, 25, 39, 40, 54 and 55.

In the first and second exemplary embodiments, a printer 200 refers to the other printers 200 through broadcasting for the missing partial data 404. However, the present invention is not limited to the above exemplary embodiments, but may be constructed such that a data managing server is provided in Internet 199, and a printer 200 refers to the data managing server for the missing partial data 404 and receives the address information from the data managing server, thereby acquiring the missing partial data 404. Specifically, the present invention may be constructed as follows.

When the data-existence notification is received, the data managing server registers the address information of the transmission source of the data-existence notification in a predetermined storage section corresponding to the data identifier 412 included in the received data-existence notification. When a data-existence confirmation request is received, the data managing server reads out the address information corresponding to the data identifier 412 included in the received data-existence confirmation request from the predetermined storage section, and transmits a data-existence response including the read-out address information to the printer 200 as the request source.

The printer 200 acquires the data identifier 412 of the partial data 404 stored in the storage section 40, and transmits the data-existence notification including the acquired data identifier 412 to the data managing server.

The printer 200 acquires the data identifier of the missing partial data 404, and transmits the data-existence confirmation request including the acquired data identifier 404 to the data managing server. When the data-existence response is received, the printer transmits the acquisition request to the data acquisition source on the basis of the address information included in the received data-existence response, thereby acquiring the partial data 404. The printer acquires the data identifier 412 of the partial data 404 stored in the storage section 40, and transmits the data-existence notification including the acquired data identifier 412, to the data managing server.

As a result, since the partial data 404 stored in the printer 200, are managed by the data managing server, the printer 200 can acquire the partial data 404 stored in the data acquisition source, only by referring to the data managing server.

In this case, the data managing server corresponds to the data managing terminal in any one of Exemplary Aspects 11, 12, 26, 27, 41, 42, 56 and 57, the storage section 40 corresponds to the data storage device in any one of Exemplary Aspects 12, 27, 42 and 57, and the data identifier 412 corresponds to the identification information in any one of Exemplary Aspects 11, 12, 26, 27, 41, 42, 56 and 57.

In the second exemplary embodiments, the optimum data format and the optimum data acquisition source are selected in consideration of the process time and the transmission time of the partial data 404 before and after the rasterizing process. However, the present invention is not limited to the above exemplary embodiments, but may be constructed such that the optimum data format and the optimum data acquisition source are selected in consideration of the process time, the transmission time, and the communication cost.

In the first and second exemplary embodiments, in principle, the storage-data registering section 54 stores entire partial data 404 acquired by the data acquiring section 52 in the storage section 40. However, the present invention may be constructed such that a printing-number counting section to count the number of printings every actually-printed partial data 404 and a data-storage determining section to determine the storage in accordance with the number of printings counted by the printing-number counting section are provided in the storage-data registering section 54, and it is determined whether the partial data are stored on the basis of the number of printings.

As a result, since only the partial data 404 being frequently used can be stored, it is possible to effectively utilize the finite storage capacity of the storage section 40. That is, as described above, since the memory actually used as the storage section 40 includes a hard disk unit, a tape storage unit, a semiconductor storage unit, etc. and the storage capacity of the storage units is naturally finite. Therefore, when entire partial data 404 actually printed are stored, the capacity is fully filled for a short time, and then the storage cannot be performed any more.

In the first and second exemplary embodiments, a printer 200 analyzes the printing request and determines the missing partial data 404. However, for example, when the printer 200 is exclusively used for an arbitrary client unit 100 and thus never accepts the printing instruction from other client units 100, the client unit 100 can accurately find out the partial data 404 stored in the printer 200. For this reason, in this case, by together transmitting the partial data 404 not stored in the printer 200 when the printing request is transmitted to the printer 200 in place of transmitting the partial data 404 in response to the acquisition request, it is possible to reduce the traffic and to reduce the time for the first printout. In this case, since transmission and reception of the acquisition request are not required, it is possible to further reduce the traffic and to further reduce the time for the first printout.

By providing a data erasing section, which erases the partial data 404 stored in the storage section 40, in the printer 200, measuring the use time intervals of each actually-stored partial data 404, and erasing only the partial data 404 of which the use time interval exceeds a predetermined time, the partial data 404 which are once stored but are not used for a long time can be erased from the printer 200, and only the partial data 404 being frequently used are thus left, so that it is possible to effectively use the finite storage capacity of the printer 200.

When a client unit 100 prepares partial data 404, it may be checked whether the partial data 404 are stored in the printer 200 and when the partial data are not stored in the printer, only new partial data 404 may be previously transmitted to the printer 200 and stored in the printer using a proper method at a proper time point before performing the printing request. Then, even if the traffic is increased when the printing request utilizing the partial data 404, the printer 200 can right perform the printing process, so that it is possible to further reduce the time for the first printout.

Here, when data are previously transmitted in this way, by performing the data transmission for the time period when the network is empty, the confusion of the network can be avoided not to affect other communications, and it is also possible to effectively transmit a large amount of printing data to the printer 200 for a short time.

By performing the data transmission using a predetermined network band, the load of the network can be equalized, so that it is possible to decrease the influence on other communications.

Specifically, the present invention can be expected to exhibit remarkable effects in a case of a network where various servers or appliances as well as the printer 200 are mixed in the network and various communications are normally performed.

Furthermore, by dividing data to be transmitted into a plurality of data pieces and performing the data transmission in units of divided data piece, the load of a network can be equalized similarly, thereby decreasing the influence on other communications.

Specifically, the present invention can exhibit still more remarkable effects under a network environment where the other communications cannot be performed during one data communication in principle, for example, under an environment such as LAN employing a CSMA/CD method, rather than under a network environment such as Internet 199 where data are packeted and transmitted.

On the other hand, when Internet 199 has plural paths, the transmission of printing requests and data may be performed through a path properly selected among the plural paths. Then, when the normal communication path is not usable or is confused, by properly selecting another path, it is possible to realize a sure communication between the client unit 100 and the printer 200.

Further, in the first and second exemplary embodiments, a protocol used for the communication between the client unit 100 and the printer 200 is not specifically limited, but TCP/IP (Transmission Control Protocol/Internet Protocol) which is standard in Internet 199 may be used. Further, a specific protocol such as AppleTalk/EtherTalk (registered trade mark), NetBEUI/NetBIOS (registered trade mark), SPX/IPX (registered trade mark), etc. may be used, if only it is unified by a specific vender.

For example, in a case of TCP/IP, TCP (Transmission Control Protocol) which is a protocol for establishing connection between the client unit 100 and the printers 200 and securing reliable communications, UDP (User Datagram Protocol) which is a connectionless type protocol for providing an efficient communication, IP (Internet Protocol) which is a protocol for transmitting packets to a predetermined destination through plural paths, etc. may be used. In addition, Telnet (Telecommunication Network) which is a protocol for remotely controlling other terminals through a network, FTP (File Transfer Protocol) which is a protocol for performing file transmission using Telnet, NFS (Network File System) which is a protocol for providing a transmissive file access function of the printers 200 to other computers to the client unit 100, SNMP (Simple Network Management Protocol) which is a protocol for exchanging network-management information such as disorder information, traffic information, etc., ARP and RARP (Address Resolution Protocol, Reverse ARP), SLIP and PPP (Serial Line Protocol, Point to Point Protocol), RIP and OSPF (Routing Information Protocol, Open Shortest Path First), RSVP (Resource Reservation Protocol), IPSec (IP Security protocol), IGMP (Internet Group Management Protocol), NTP (Network Time Protocol), etc. may be used.

In addition to personal computers which are general-use computers as a client unit 100, network-correspondence apparatuses such as mobile phones, PHS (registered trade mark) (Personal Handyphone System), PDA (Personal Digital Assistant), switching apparatuses, NCU (Network Control Unit), routers, hubs, bridges, gateways, POS (Point Of Sale) terminals, etc. may be also used.

Furthermore, in the first and second exemplary embodiments, the printing is requested to one printer 200 designated by a user. However, the present invention is not limited to the above exemplary embodiments, but may be constructed such that distribution printing is requested to plural printers 200 designated by a user. In this case, the present invention can be also applied, similarly to the first and second exemplary embodiments.

Furthermore, in the first and second exemplary embodiments, when the processes shown in the flowcharts of FIGS. 9, 12, 13, 14, 15, 16, and 18 are performed, there has been described a case where the control program previously stored in the ROM 32, 72 is executed. However, the present invention is not limited to this, but may be applied to a case of reading out programs into the RAM 34, 74 from a storage medium in which the programs indicating the procedure and executing the programs, as shown in FIG. 20.

Figure 20:
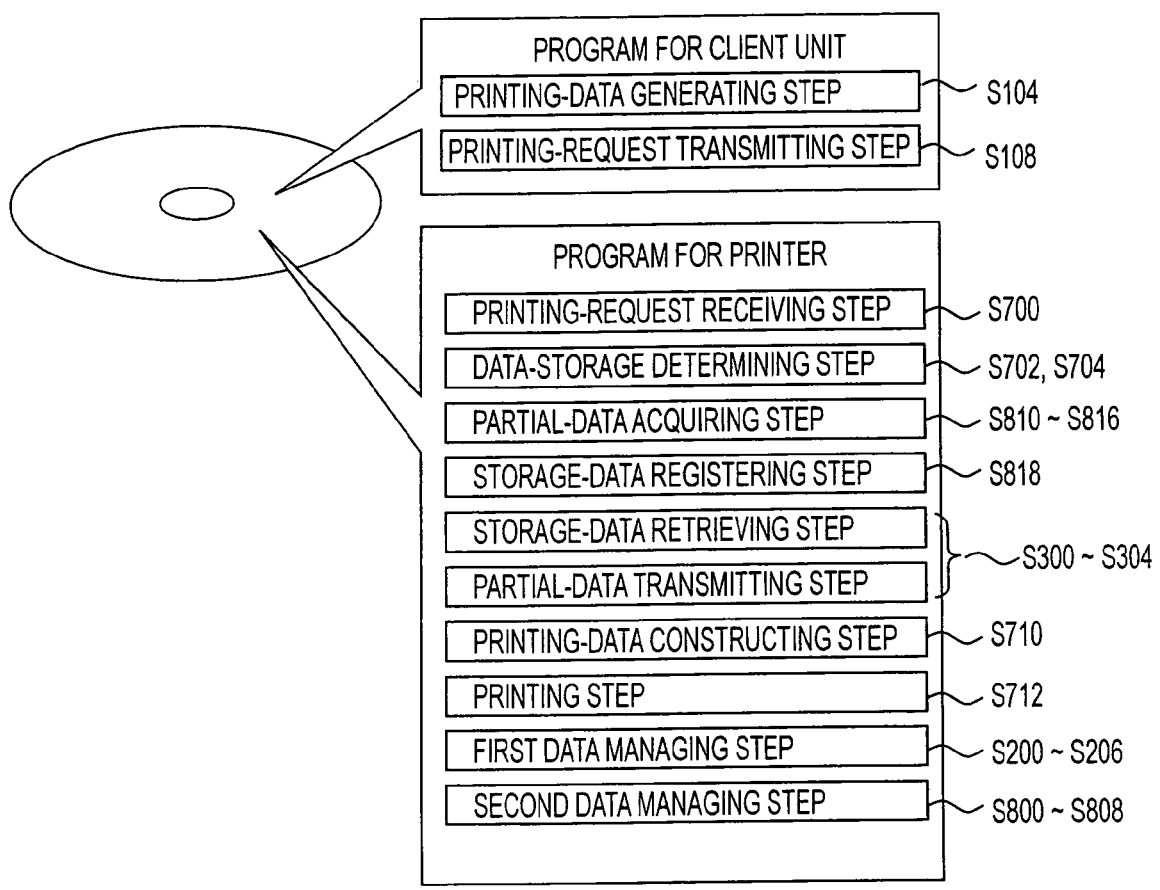
FIG. 20 is a schematic showing a storage medium and a data structure thereof.

FIG. 20 is a schematic showing a storage medium and a data structure thereof.

Here, the storage medium can include a semiconductor storage medium such as RAM, ROM, etc., a magnetically-recordable storage medium such as FD, HD, etc., an optically-readable storage medium such as CD, CDV, LD, DVD, etc., and a magnetically-recordable/optically-readable storage medium such as MO, and can include entire storage mediums, if only they can be read out by a computer, whether the read-out method is electronic, magnetic, optical, etc.

In the first and second exemplary embodiments, it has been described that the network data processing system, the network printing system, the data processor, the printer, the data processing program, the print processing program, the network data processing method, and the network printing method according to the present invention are applied to the network system including Internet 199. However, the present invention is not limited to this case, and may be applied to, for example, a so-called Intranet for performing communications in the same manner as Internet 199. Of course, the present invention is not limited to the network for performing communications in the same manner as Internet 199, and may be applied to normal networks.

In the first and second exemplary embodiments, the network data processing system, the network printing system, the data processor, the printer, the data processing program, the print processing program, the network data processing method, and the network printing method according to the present invention have been applied to the case where the printer 200 performs the printing in response to the printing request from the client unit 100, as shown in FIG. 1. However, the present invention is not limited to the exemplary embodiments, and may be applied to other cases within a range not departing from the spirit and scope of the present invention.

What is claimed is:

1. A network printing system for use with a network, the network printing system comprising:
a plurality of printers connected to the network;
a printing request unit to request printing to at least one of the plurality of printers, connected to the network, the printing request unit includes:
a printing-data generating device to generate printing data which is divided so as to correspond to constituent parts constituting printing contents; and
a printing-request transmitting device to transmit to the printers a printing request which includes structure information indicating the divided structure of the printing data generated by the printing-data generating device and identification information to identify partial data corresponding to the respective constituent parts,
the printer including:
a data storage device to store all or a part of the printing data in units of divided data;
a stored-data retrieving device to retrieve the partial data from the data storage device in response to an acquisition request from another printer;
a partial-data transmitting device to transmit the partial data detected by the stored-data retrieving device to the printer as a request source;
a printing-request receiving device to receive the printing request;
a data-storage determining device to analyze the printing request received by the printing-request receiving device and determining whether partial data necessary for constructing the printing data are stored in the data storage device;
a partial-data acquiring device to acquire missing partial data to construct the printing data from the other printer on the basis of the determination result of the data-storage determining device;
a printing-data constructing device to construct the printing data on the basis of the partial data acquired by the partial-data acquiring device and the partial data in the data storage device;
a printing device to perform the printing on the basis of the printing data constructed by the printing-data constructing device; and
a stored-data registering device to store the partial data acquired by the partial-data acquiring device in the data storage device, and
the partial-data acquiring device acquiring the partial data from at least one of a printer for which time required for data transmission is shortest and a printer for which time required for data transmission is estimated to be shortest, among the plurality of printers.

2. The network printing system according to claim 1,
the printer using the plurality of printers as data acquisition sources, respectively, and further including a hop-count information storage device to store hop-count information, which indicates a hop count as a number of connection stages of repeaters in a communication path with each data acquisition source, corresponding to the corresponding data acquisition source, and
the partial-data acquiring device reading out the hop-count information corresponding to each data acquisition source from the hop-count information storage device, selecting a data acquisition source whose hop count is smallest among the data acquisition sources, on the basis of the read-out hop-count information, and transmitting the acquisition request to the selected data acquisition source, thereby acquiring the partial data.

3. The network printing system according to claim 2,
the hop-count information storage device storing the hop-count information indicating the number of connection stages of repeaters in a communication path to each data acquisition source and communication-path information specifying the communication path, corresponding to the corresponding data acquisition source, and the partial-data acquiring device transmitting the acquisition request to the selected data acquisition source and acquiring the partial data through the communication path specified on the basis of the communication-path information corresponding to the data acquisition source.

4. The network printing system according to claim 1, the printer using the plurality of printers as data acquisition sources, respectively, and further including an arrival-time information storage device to store arrival-time information, which indicates an arrival time of a packet at each data acquisition source, corresponding to the corresponding data acquisition source, and the partial-data acquiring device reading out the arrival-time information corresponding to each data acquisition source from the arrival-time information storage device, selecting a data acquisition source whose arrival time is shortest, among the plurality of data acquisition sources, on the basis of the read-out arrival-time information, and transmitting the acquisition request to the selected data acquisition source, thereby acquiring the partial data.

5. The network printing system according to claim 4, the arrival-time information storage device storing the arrival-time information indicating the arrival time of a packet at each data acquisition source and communication-path information specifying a communication path to each data acquisition source corresponding to the corresponding data acquisition source, and the partial-data acquiring device transmitting the acquisition request to the selected data acquisition source and acquiring the partial data through the communication path specified on the basis of the communication-path information corresponding to the selected data acquisition source.

6. The network printing system according to claim 1, each printer further including a first data managing device to manage the partial data stored in the data storage device, a second data managing device to manage the partial data, and an address-information storage device to store address information, the stored-data registering device storing the respective partial data constituting the printing data in the data storage device corresponding to identification information identifying the partial data, the second data managing device acquiring the identification information identifying the partial data necessary to construct the printing data and broadcasting a data-existence confirmation request including the acquired identification information, and when a data-existence response indicating that the partial data exist is received, the second data managing device registers the address information of the transmission source of the data-existence response in the address-information storage device, when the data-existence confirmation request is received, the first data managing device retrieving the same identification information as the identification information included in the received data-existence confirmation request from the data storage device, and when the identification information is detected, the first data managing device transmitting the data-existence response to the printer as the request source, and the partial-data acquiring device reading out the address information corresponding to an acquisition source of the partial data from the address-information storage device, and transmitting the acquisition request to the data acquisition source on the basis of the read-out address information, thereby acquiring the partial data.

7. The network printing system according to claim 1, the printer further including a first data managing device to manage the partial data stored in the data storage device, a second data managing device to manage the partial data, and an address-information storage device to store address information, the stored-data registering device storing the respective partial data constituting the printing data in the data storage device corresponding to identification information identifying the respective partial data, the first data managing device reading out the identification information corresponding to the respective partial data in the data storage device from the data storage device, and broadcasting a data-existence notification including the read-out identification information, when the data-existence notification is received, the second data managing device registering the address information of the transmission source of the data-existence notification in the address-information storage device corresponding to the identification information included in the received data-existence notification, and the partial-data acquiring device acquiring the identification information identifying the corresponding partial data necessary to construct the printing data, reading out the address information corresponding to the acquired identification information from the address-information storage device, and transmitting the acquisition request to an acquisition source of the partial data on the basis of the read-out address information, thereby acquiring the partial data.

8. The network printing system according to claim 1, the printer further including a first data managing device to manage the partial data stored in the data storage device and an address-information storage device to store address information, the first data managing device using the plurality of printers as data acquisition sources, respectively, and registering the address information of the data acquisition source storing the partial data in the address-information storage device, corresponding to identification information identifying the partial data, and when a data-existence confirmation request including the identification information is received, the first data managing device reading out the address information corresponding to the identification information included in the received data-existence confirmation request from the address-information storage device and transmitting a data-existence response including the read-out address information to a printer as a request source, and the partial-data acquiring device acquiring the identification information identifying the corresponding partial data necessary to construct the printing data and transmitting a data-existence confirmation request including the acquired identification information to the data acquisition source, and when the data-existence response is received, the partial-data acquiring device transmitting the acquisition request to the data acquisition source on the basis of the address information included in the received data-existence response, thereby acquiring the partial data.

9. The network printing system according to claim 8, the first data managing device acquiring the identification information identifying the partial data stored in the data storage device, and registering the address information of the corresponding printer in the address-information storage device corresponding to the acquired identification information.

10. The network printing system according to claim 1,
the plurality of printers being used as data acquisition sources, respectively, and a data managing terminal to manage the stored data of the data acquisition sources, being connected to the network,
the data managing terminal having a data managing device to manage the stored data of the data acquisition sources and an address-information storage device to store address information,
the data managing device registering the address information of the data acquisition source storing the partial data in the address-information storage device corresponding to identification information identifying the corresponding partial data, and when a data-existence confirmation request including the identification information is received, the data managing device reading out the address information corresponding to the identification information included in the received data-existence confirmation request from the address-information storage device and transmitting a data-existence response including the read-out address information, to the printer as a request source, and
the partial-data acquiring device acquiring the identification information identifying the corresponding partial data necessary to construct the printing data and transmitting a data-existence confirmation request including the acquired identification information, to the data managing terminal, and when the data-existence response is received, the partial-data acquiring device transmitting the acquisition request to the data acquisition source on the basis of the address information included in the received data-existence response, thereby acquiring the partial data.

11. The network printing system according to claim 10,
each printer further including a first data managing device to manage the partial data stored in the data storage device,
the first data managing device acquiring identification information identifying the corresponding partial data stored in the data storage device and transmitting a data-existence notification including the acquired identification information to the data managing terminal, and
when the data-existence notification is received, the data managing device registering the address information of the transmission source of the data-existence notification in the address-information storage device corresponding to the identification information included in the received data-existence notification.

12. A network printing system for use with a network, comprising:
a plurality of printers connected to the network;
a printing request unit to request printing to at least one of the plurality of printers, connected to the network,
the printing request unit including:
a printing-data generating device to generate printing data which is divided so as to correspond to constituent parts constituting printing contents; and
a printing-request transmitting device to transmit to the printers a printing request, which includes structure information indicating the divided structure of the printing data generated by the printing-data generating device and identification information to identify partial data corresponding to the respective constituent parts, the printer includes:
a data storage device to store all or a part of the printing data in units of divided data;
a stored-data retrieving device to retrieve the partial data from the data storage device in response to an acquisition request from another printer;
a partial-data transmitting device to transmit the partial data detected by the stored-data retrieving device to the other printer serving as a request source;
a printing-request receiving device to receive the printing request;
a data-storage determining device to analyze the printing request received by the printing-request receiving device and to determine whether partial data necessary for constructing the printing data are stored in the data storage device;
a partial-data acquiring device to acquire missing partial data to construct the printing data from the other printers on the basis of the determination result of the data-storage determining device;
a printing-data constructing device to construct the printing data on the basis of the partial data acquired by the partial-data acquiring device and the partial data in the data storage device;
a printing device to perform the printing on the basis of the printing data constructed by the printing-data constructing device;
a stored-data registering device to store the partial data acquired by the partial-data acquiring device in the data storage device; and
a communication-cost information storage device which uses the plurality of printers as data acquisition sources, respective, and stores communication-cost information indicating the communication cost required for communication with the corresponding data acquisition source corresponding to the corresponding data acquisition source, and
the partial-data acquiring device reading out the communication-cost information corresponding to the respective data acquisition sources from the communication-cost information storage device, selecting a data acquisition source whose communication cost is smallest among the plurality of data acquisition sources, on the basis of the read-out communication-cost information, and transmitting the acquisition request to the selected data acquisition source, thereby acquiring the partial data.

13. The network printing system according to claim 12,
the communication-cost information storage device storing the communication-cost information indicating the communication cost required for communication with each data acquisition source and communication-path information specifying the communication path to the corresponding data acquisition source corresponding to the corresponding data acquisition source, and
the partial-data acquiring device transmitting the acquisition request to the selected data acquisition source and acquiring the partial data through the communication path specified on the basis of the communication-path information, corresponding to the selected data acquisition source.

14. A printer, comprising:
a data storage device to store all or a part of printing data, which are divided to correspond to respective constituent parts constituting printing contents, in units of divided data;

a stored-data retrieving device to retrieve partial data corresponding to the constituent parts from the data storage device in response to an acquisition request from another printer;

a partial-data transmitting device to transmit the partial data detected by the stored-data retrieving device to a printer as a request source;

a partial-data acquiring device to acquire the partial data necessary to construct the printing data from the other printer;

a printing-data constructing device to construct the printing data on the basis of the partial data acquired by the partial-data acquiring device; and a printing device to perform the printing on the basis of the printing data constructed by the printing-data constructing device, the partial-data acquiring device acquiring the partial data from a printer for which at least one of time required for data transmission is shortest and for which the time required for data transmission is estimated to be shortest, among a plurality of the printers.

15. A printer, comprising:

a data storage device to store all or a part of printing data, which are divided to correspond to respective constituent parts constituting printing contents, in units of divided data;

a stored-data retrieving device to retrieve partial data corresponding to the constituent parts from the data storage device in response to an acquisition request from another printer;

a partial-data transmitting device to transmit the partial data detected by the stored-data retrieving device to the other printer serving as a request source;

a partial-data acquiring device to acquire the partial data necessary to construct the printing data from the other printer;

a printing-data constructing device to construct the printing data on the basis of the partial data acquired by the partial-data acquiring device;

a printing device to perform printing on the basis of the printing data constructed by the printing-data constructing device; and a communication-cost information storage device which uses a plurality of the printers as data acquisition sources, respective, and stores communication-cost information indicating the communication cost required for communication with each data acquisition source corresponding to the corresponding data acquisition source, the partial-data acquiring device reading out the communication-cost information corresponding to the respective data acquisition sources from the communication-cost information storage device, selecting a data acquisition source whose communication cost is smallest among the plurality of data acquisition sources, on the basis of the read-out communication-cost information, and transmitting the acquisition request to the selected data acquisition source, thereby acquiring the partial data.

16. A computer readable medium storing a print processing program which allows a computer to perform a process, the process comprising:

retrieving partial data from a data storage device to store all or a part of printing data, which are divided to correspond to respective constituent parts constituting printing contents, in units of divided data, in response to an acquisition request from another printer;

transmitting the partial data detected in the stored-data retrieving to a printer as a request source;

acquiring the partial data necessary to construct the printing data from the other printer;

constructing the printing data on the basis of the partial data acquired in the partial-data acquiring; and performing the printing on the basis of the printing data constructed in the printing-data constructing, in the partial-data acquiring, the partial data being acquired from a printer for which at least one of time required for data transmission is shortest and for which the time required for data transmission is estimated to be shortest, among a plurality of the printers.

17. A computer readable medium storing a print processing program which allows a computer to perform a process, the process comprising:

retrieving partial data from a data storage device to store all or a part of printing data, which are divided to correspond to respective constituent parts constituting printing contents, in units of divided data, in response to an acquisition request from another printer;

transmitting the partial data detected in the stored-data retrieving to a printer as a request source;

acquiring the partial data necessary to construct the printing data from the other printer;

constructing the printing data on the basis of the partial data acquired in the partial-data acquiring; and performing the printing on the basis of the printing data constructed in the printing-data constructing, in the partial-data acquiring, the plurality of printers being used as data acquisition sources, respectively, communication-cost information corresponding to each data acquisition source being read out from a communication-cost information storage device to store the communication-cost information indicating the communication cost necessary for communication with each data acquisition source corresponding to the corresponding data acquisition source, a data acquisition source, whose communication cost is smallest among the plurality of data acquisition sources, being selected on the basis of the read-out communication-cost information, and the acquisition request being transmitted to the selected data acquisition source, thereby acquiring the partial data.

18. A network printing method for use with a network, in which a plurality of printers and a printing request unit to request printing to at least one printer of the plurality of printers are connected to the network and a printing process is performed through communications between the printers, the network printing method comprising:

for a first printer, acquiring partial data necessary to construct printing data, which are divided to correspond to respective constituent parts constituting printing contents, from a printer for which at least one of time required for data transmission is shortest and for which the time required for data transmission is estimated to be shortest, among the plurality of printers;

for a second printer, retrieving the partial data from a data storage device in response to an acquisition request from the first printer; and transmitting the partial data detected in the stored-data retrieving to the first printer; and for the first printer, constructing the printing data on the basis of the partial data acquired in the partial-data acquiring; and performing the printing on the basis of the printing data constructed in the printing-data constructing.

19. A network printing method for use with a network in which a plurality of printers and a printing request unit to request printing to at least one printer of the plurality of printers, are connected to the network and a printing process is performed through communications between the printers, the network printing method comprising:

- for a first printer, acquiring partial data necessary to construct printing data, which are divided to correspond to respective constituent parts constituting printing contents, from a printer for which at least one of time required for data transmission is shortest and for which the time required for data transmission is estimated to be shortest, among the plurality of printers,
- for a second printer, retrieving the partial data from a data storage device in response to an acquisition request from the first printer; and transmitting the partial data detected in the stored-data retrieving to the first printer; and
- for the first printer, constructing the printing data on the basis of the partial data acquired in the partial-data acquiring; and performing the printing on the basis of the printing data constructed in the printing-data constructing,
- in the partial-data acquiring, the plurality of printers being used as data acquisition sources, respectively, communication-cost information corresponding to each data acquisition source being read out from a communication-cost information storage device to store the communication-cost information indicating the communication cost necessary for communication with each data acquisition source corresponding to the corresponding data acquisition source, a data acquisition source, whose communication cost is smallest among the plurality of data acquisition sources, being selected on the basis of the read-out communication-cost information, and the acquisition request being transmitted to the selected data acquisition source, thereby acquiring the partial data.

* * * * *